US012278449B2

(12) United States Patent
Hayashi et al.

(10) Patent No.: US 12,278,449 B2
(45) Date of Patent: Apr. 15, 2025

(54) CONNECTOR AND SOCKET AND HEADER USED FOR THE CONNECTOR

(71) Applicant: Panasonic Intellectual Property Management Co., Ltd., Osaka (JP)

(72) Inventors: Takuya Hayashi, Mie (JP); Yoji Miyazaki, Mie (JP); Hiroshi Tanaka, Osaka (JP); Kazumasa Iijima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 17/727,174

(22) Filed: Apr. 22, 2022

(65) Prior Publication Data

US 2022/0247132 A1 Aug. 4, 2022

Related U.S. Application Data

(63) Continuation of application No. 17/001,253, filed on Aug. 24, 2020, now Pat. No. 11,342,715.

(30) Foreign Application Priority Data

Sep. 30, 2019 (JP) ................................ 2019-180690

(51) Int. Cl.
*H01R 13/6587* (2011.01)
*H01R 13/11* (2006.01)
(Continued)

(52) U.S. Cl.
CPC ......... *H01R 13/6587* (2013.01); *H01R 13/11* (2013.01); *H01R 13/6582* (2013.01);
(Continued)

(58) Field of Classification Search
CPC ................ H01R 13/6587; H01R 13/11; H01R 13/6582; H01R 13/6594; H01R 12/70;
(Continued)

(56) References Cited

U.S. PATENT DOCUMENTS 10,084,245 B2 9/2018 Chang
2006/0040557 A1 2/2006 Yamaguchi
(Continued)

FOREIGN PATENT DOCUMENTS

JP 2006-059589 A 3/2006
JP 2016-066477 A 4/2016
(Continued)

OTHER PUBLICATIONS

Non-Final Office Action dated Aug. 30, 2021 issued in U.S. Appl. No. 17/001,253.
(Continued)

*Primary Examiner* — Justin M Kratt
(74) *Attorney, Agent, or Firm* — Rimon P.C.

(57) ABSTRACT

In a connector, each of housings of a socket and a header serving as connector parts includes: a terminal holder extending in a first direction and includes a terminal section of the associated connector part; and a side wall connector extending in a second direction intersecting the first direction, and connected to one end of the terminal holder of the associated connector part in the first direction. The shield member includes a first portion on the side wall connector, and a second portion aligned with the terminal holder of the connector part in the second direction. The socket and the header are inserted into each other in a third direction intersecting the first and second directions. The second portion of at least one of the shield members includes a shield bent portion with a curved portion curving toward the other connector part to be inserted.

21 Claims, 16 Drawing Sheets

(51) Int. Cl.

| | |
|---|---|
| ***H01R 13/6582*** | (2011.01) |
| ***H01R 13/6594*** | (2011.01) |
| *H01R 12/70* | (2011.01) |
| *H01R 12/71* | (2011.01) |
| *H01R 12/73* | (2011.01) |
| *H01R 13/20* | (2006.01) |
| *H01R 13/639* | (2006.01) |
| *H01R 13/6591* | (2011.01) |
| *H01R 27/02* | (2006.01) |

(52) U.S. Cl.
CPC ......... *H01R 13/6594* (2013.01); *H01R 12/70* (2013.01); *H01R 12/71* (2013.01); *H01R 12/712* (2013.01); *H01R 12/716* (2013.01); *H01R 12/73* (2013.01); *H01R 13/20* (2013.01); *H01R 13/639* (2013.01); *H01R 13/6591* (2013.01); *H01R 27/02* (2013.01)

(58) Field of Classification Search
CPC .... H01R 12/71; H01R 12/712; H01R 12/716; H01R 12/73; H01R 13/20; H01R 13/639; H01R 13/6591; H01R 27/02
See application file for complete search history.

(56) References Cited

U.S. PATENT DOCUMENTS

| | | | |
|---|---|---|---|
| 2017/0033479 | A1 | 2/2017 | Ozeki |
| 2018/0175561 | A1 | 6/2018 | Chen |
| 2019/0190209 | A1 | 6/2019 | Horino et al. |
| 2020/0006874 | A1 | 1/2020 | Ueda |
| 2020/0220287 | A1 | 7/2020 | Hirakawa |

FOREIGN PATENT DOCUMENTS

| | | | | |
|---|---|---|---|---|
| JP | 2017-033655 | A | | 2/2017 |
| JP | 2018-022672 | A | | 2/2018 |
| JP | 2018-152190 | A | | 9/2018 |
| JP | 2019-040823 | A | | 3/2019 |
| JP | 2019-087382 | A | | 6/2019 |
| KR | 20170129066 | A | * | 11/2017 |
| KR | 1020170129066 | A | * | 11/2017 |

OTHER PUBLICATIONS

Notice of Allowance dated Jan. 26, 2022 issued in U.S. Appl. No. 17/001,253.

* cited by examiner

CONNECTOR AND SOCKET AND HEADER USED FOR THE CONNECTOR

CROSS-REFERENCE TO RELATED APPLICATION

This application is a Continuation of U.S. patent application Ser. No. 17/001,253, filed on Aug. 24, 2020, which claims priority to Japanese Patent Application No. 2019-180690 filed on Sep. 30, 2019, the entire disclosures of which applications are incorporated by reference herein.

BACKGROUND

The present disclosure relates to a connector and a socket and a header used for the connector.

A typically known connector includes a socket including a plurality of socket-side terminals in a socket body, and a header including a plurality of header-side terminals in a header body (see, e.g., Japanese Unexamined Patent Publication No. 2018-152190).

In the connector described in Japanese Unexamined Patent Publication No. 2018-152190, the connector (i.e., the socket) held by a first substrate and the header held by a second substrate are fitted into each other while facing each other so that the corresponding terminals come into contact with each other to conduct electricity. Accordingly, the circuit patterns of the substrates having terminals connected thereto are electrically connected to each other.

Radio frequency (RF) signals may be applied to terminals of a connector (see, e.g., Japanese Unexamined Patent Publication Nos. 2019-040823 and 2017-033655).

In a fifth generation mobile communication system (what is called a "5G") that is currently being developed, mounting of multiple antenna elements in various devices is attempted to achieve multiple simultaneous connections, for example.

SUMMARY

However, when RF signals are applied to terminals of a connector, reduction in unnecessary radiation from the terminals and noise mixed into the terminals is required.

When different RF signals are applied to the terminals of the connector, there is a need to reduce the interference between these RF signals.

In view of the typical problems described above, it is an objective of the present disclosure is to reduce unnecessary radiation, noise, and interference between RF signals in a connector to which the RF signals are applied, that is, a socket and a header.

In order to achieve the objective, the present disclosure provides the following configuration. A gap is provided between each of side walls of a socket and a header facing each other and a shield member located outside. The shield member has, in a cross section, a curved portion (or a bent portion) curving toward another shield member to be inserted. In a connector in which the socket and the header are fitted into each other, the shield members of the socket and the header are electrically connected to each other.

Specifically, the present disclosure is directed to a connector, and a socket and a header used for the connector, and provides the following solution.

Specifically, a connector according to one aspect of the present disclosure includes: a socket including a housing, a terminal section, and a shield member; and a header including a housing, a terminal section, and a shield member. The socket and the header serve as connector parts. In each of the connector parts of the socket and the header, the housing includes: a terminal holder extending in a first direction and including the terminal section of an associated one of the connector parts; and a side wall connector extending in a second direction intersecting the first direction, and connected to one end of the terminal holder of the associated one of the connector parts in the first direction. The shield member includes: a first portion on the side wall connector of the associated one of the connector parts; and a second portion aligned with the terminal holder of the associated one of the connector parts in the second direction. The socket and the header are inserted into each other in a third direction intersecting the first direction and the second direction. The second portion of the shield member of at least one of the connector parts of the socket and the header includes a shield bent portion with a curved portion curving toward the other connector part of the socket or the header to be inserted.

According to the present disclosure, unnecessary radiation, noise, and interference between RF signals decrease in a connector to which the RF signals are applied and a socket and header used for the connector.

DETAILED DESCRIPTION

Figure 1:
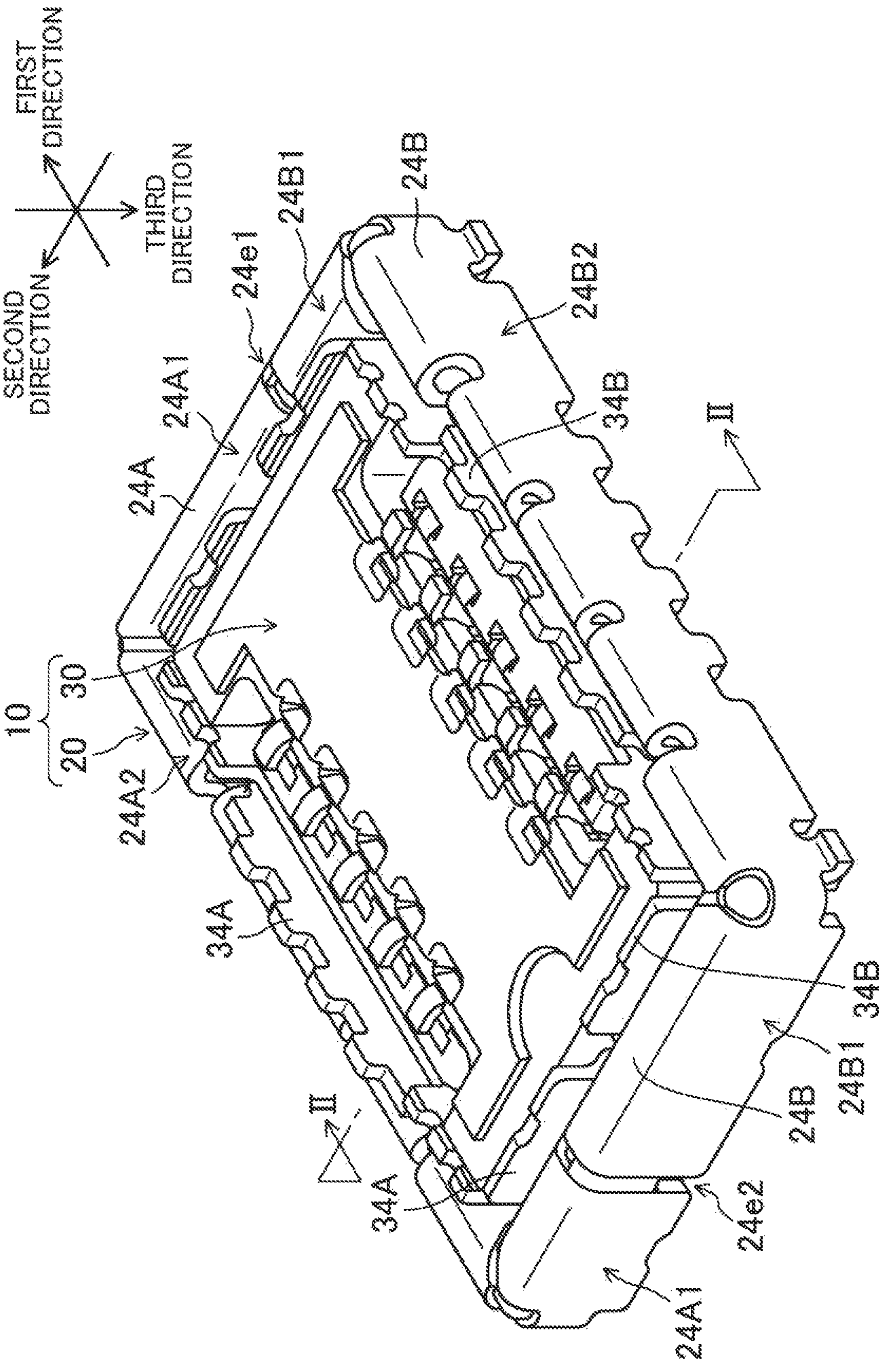
FIG. 1 is a perspective view of a connector according to an embodiment of the present disclosure.

The connector 10 according to one embodiment of the present disclosure includes a socket 20 and a header 30. The socket 20 includes a socket housing 21, socket terminal sections 22A and 22B, and socket shield members 24A and 24B. The header 30 includes a header housing 31, header terminal sections 32A and 32B, and header shield members 34A and 34B. The socket 20 and the header 30 serve as connector parts. In the connector parts of the socket 20 and the header 30, the housings 21 and 31 include terminal holders 21*a* and 31*a* and side wall connectors 21*d* and 31*d*, respectively. The terminal holders 21*a* and 31*a* extend in a first direction and include the terminal sections 22A and 32A of the connector parts, respectively. The side wall connectors 21*d* and 31*d* extend in a second direction intersecting the first direction, and connected to one ends of the terminal holders 21*a* and 31*a* of the connector parts, respectively, in the first direction. The shield members 24A and 34A include first portions 24A1 and 34A1 on the side wall connectors 21*d* and 31*d* of the connector parts, respectively, and second portions 24A2 and 34A2 aligned with the terminal holders 21*a* and 31*a* of the connector parts, respectively, in the second direction. The socket 20 and the header 30 are inserted into each other in a third direction intersecting the first and second directions. The second portion 24A2 or 34A2 of the shield member 24A or 34A of at least one of the socket 20 or the header 30 has a shield bent portion 24*f* or 34*f* with a curved portion 242 or 342 curving toward the other connector part of the socket 20 or the header 30 to be inserted.

With this configuration, the second portion of the shield member of at least one of the socket or the header has the shield bent portion with a curved portion curving toward the other connector part of the socket or the header to be inserted. At the shield bent portion, the shield members overlap each other. Accordingly, when radio frequency (RF) signals are applied to the connector, unnecessary radiation from the connector and noise as well as interference between the RF signals decrease.

In the connector according to one embodiment, the second portions 34A2 and 34B2 of the shield members 34A and 34B of the header 30 may overlap the second portions 24A2 and 24B2 of the shield members 24A and 24B of the socket 20, respectively in the second direction.

With this configuration, the corresponding portions of the shield members of the socket and the header overlap each other. This configuration further reduces unnecessary radiation from the connector and noise as well as interference between the RF signals.

In the connector according to one embodiment, the housing 21 or 31 of at least one of the connector parts includes side walls 21*b* and 21*c* or 31*b* and 31*c* extending in the first direction, and located outside the terminal holder 21*a* or 31*a* of the housing 21 or 31 in the second direction. The shield members 24A and 34A may be provided on the side walls.

With this configuration, even when a gap is provided between the shield member and the terminal holder 21*a* or 31*a*, the shield member can be reliably held in the housing.

In this case, the shield member 24A on the side walls 21*b* and 21*c* may have a shield bent portion 24*f* in the second portion 24A2.

In this configuration, the elasticity of the shield bent portion improves the shielding effect of the shield member and reduces deformations when fitting the connector parts.

In the connector according to one embodiment, the shield members 24A and 24B of the socket 20 may come into contact with the shield members 34A and 34B of the header 30, respectively.

With this configuration, the shield members of the connector parts have ground potentials, for example.

In the connector according to one embodiment, the shield bent portion 24*f* or 34*f* in the second portion 24A2 or 34A2 of the shield member 24A or 34A may include pieces 241*a* to 241*c* aligned in the first direction.

This configuration increases the elasticity of the shield bent portion.

In this case, the pieces 241*a* to 241*c* may come into contact with the second portion 24A2 or 34A2 of the shield member 24A or 34A of the other connector part.

With this configuration, the shield member with the double-layer structure of the shield bent portion shields the terminal holder, which improves the shielding effect.

In the connector according to one embodiment, the second portions 34A2 and 34B2 of the shield members 34A and 34B of the header 30 may be inserted between the second portion 24A2 of the shield member 24A of the socket 20 and the terminal holder 21*a* of the socket 20 and between the second portion 24B2 of the shield member 24B of the socket 20 and the terminal holder 21*a* of the socket 20, respectively. A part of the terminal holder 21*a* of the socket 20 may be inserted between the second portions 34A2 and 34B of the shield members 34A and 34B of the header 30 and the terminal holder 31*a* of the header 30.

In this configuration, the second portions of the shield members of the header are inserted between the second portions of the shield members of the socket and the terminal holder of the socket, and the terminal holder of the socket is inserted between the second portions of the shield members of the header and the terminal holder of the header. For this reason, when each of the shield members of the socket and the header has the shield bent portion, the shield members with, at the maximum, a four-layer structure are inserted, which further improves the shielding effect.

In the connector according to one embodiment, each of the second portions 24A2 and 24B2 of the shield members 24A and 24B of the socket 20 has the shield bent portion 24*f*. Each of the second portions 34A2 and 34B2 of the shield members 34A and 34B of the header 30 has the shield bent portion 34*f*. The shield bent portions 24*f* of the second portions 24A2 and 24B2 of the shield members 24A and 24B may be in contact with the respective shield bent portions 34*f* of the second portions 34A2 and 34B2 of the shield members 34A and 34B.

In this configuration, in each of the socket and the header, the shield members with the four-layer structure are inserted in the second portions of the associated shield members, which further improves the shielding effect.

In the connector according to one embodiment, the shield member 24A or 34A of at least one of the connector parts may include a shield connector 24*b* or 34*b* at the corner of the side wall connector 21*d* or 31*d* of the at least one of the connector parts. The shield connector 24*b* or 34*b* may have a cutout 24*c* or 34*c* in the side wall surface of the side wall connector 21*d* or 31*d*, and a connection portion 24*b*1 or 34*b*1 connecting the first portion 34A1 or 24A1 with the second portion 24A2 or 34A2 together.

In this configuration, the shield connector at the corner of the side wall connector of the connector part has the cutout, which facilitates bending of the shield connector along the corner.

In this case, the socket 20 includes the shield connector 24*b*, while the header 30 includes the shield connectors 34*b* facing the shield connectors 24*b* of the socket 20. In the direction in which the shield connectors 24*b* and 34*b* face each other, the connection portion 24*b*1 or 34*b*1 of one of the shield connectors 24*b* or 34*b* may overlap the cutout 24*c* or 34*c* of the other shield connector 24*b* or 34*b*.

In this configuration, at least a part of each cutout of one of the connector parts is shielded by the connection portions of the other connector part, which reduces the degradation in the shielding effect caused by the cutouts.

In the connector according to one embodiment, when the shield member has the cutouts and the connection portions, the side wall surfaces may be inner wall surfaces 21*d*2 and 21*e*2 of side wall connectors 21*d* and 21*e*. The cutouts 24*c* are cut out in the direction from the inner wall surfaces 21*d*2 and 21*e*2 toward the upper wall surfaces 21*d*3 and 21*e*3 of the side wall connectors 21*d* and 21*e*, respectively. As viewed in the third direction, at the edge and opening of each cutout 24*c*, an outer edge connected to the edge may form an angle greater than 90°.

This configuration reduces the width of the opening of each cutout, which reduces the degradation in the shielding effect caused by the cutouts.

In the connector according to one embodiment, when the shield member has the cutouts and the connection portions, the side wall surfaces may be outer wall surfaces 31*d*1 and 31*e*1 of side wall connectors 31*d* and 31*e*. The cutouts 34*c* are cut out in the direction from the outer wall surfaces 31*d*1 and 31*e*1 toward the upper wall surfaces 31*d*3 and 31*e*3 of the side wall connectors 31*d* and 31*e*, respectively. As viewed in the third direction, at the edge and opening of each cutout 34*c*, an outer edge connected to the edge may form an angle smaller than 90°.

This configuration reduces the width of the opening of each cutout, which reduces the degradation in the shielding effect caused by the cutouts.

In the connector according to one embodiment, provided on the side wall connectors 21*d* and 21*e* of the socket 20 is another shield member 24B separated from the shield member 24A of the socket 20 with slits 24*e*1 and 24*e*2 interposed therebetween. Provided on the side wall connectors 31*d* and 31*e* of the header 30 is another shield member 34B separated from the shield member 34A of the header 30 with slits 34*e*1 and 34*e*2 interposed therebetween. In the first direction, the side wall connectors 21*d* and 21*e* of the socket 20 face the side wall connectors 31*d* and 31*e* of the header 30, respectively. The slits 34*e*1 and 34*e*2 may not overlap the slits 24*e*1 and 24*e*2, respectively.

In this configuration, the slits of one of the connector parts are shielded by the shield members of the other connector part, which reduces the degradation in the shielding effect caused by the slits.

In the connector according to one embodiment, each of the first portions 24A1 or 34A1 of the shield member 24A or 34A of at least one of the connector parts may include a first shield 24*f*1 or a second shield 34*f*2. The first shield 24*f*1 covers the side wall surfaces 21*d*1, 21*d*2, 31*d*1, and 31*d*2 of the side wall connectors 21*d* and 31*d* of the connector parts. The second shield 34*f*2 covers the upper wall surfaces 21*d*3 and 31*d*3 and the side wall surfaces 21*d*1, 21*d*2, 31*d*1, and 31*d*2 of the side wall connectors 21*d* and 31*d* of the connector parts. Each of the second shields 34*f*2 is connected to the associated one of the first shields 24*f*1.

In the connector according to one embodiment, the shield member 24A or 34A of at least one of the connector parts may have projections 34*g* projecting in at least one of the first or second direction. The projection 34*g* may come into contact with the shield member 24A or 34A of the other connector part.

In this configuration, the projections in the shield members of the connector part ensure a mechanical and electrical connection with the shield members of the other connector part.

In this case, each of the first portions 24A1 and 24B1 of the shield members 24A and 24B of the socket may include the first shield 24*f*1 covering the inner wall surface 21*d*2 or 21*e*2 of the associated one of the side wall connectors 21*d* or 21*e* of the socket 20. Each of the first portions 34A1 and 34B1 of the shield members 34A and 34B of the header 30 may include the second shield 34*f*2 covering the outer wall surface 31*d*1 or 31*e*1 of the associated one of the side wall connectors 31*d* or 31*e* of the header 30. Each second shield 34*f*2 may include the projection 34*g* in contact with the associated one of the first shields 24*f*1.

In the connector according to one embodiment, when each shield member includes the projections, the socket housing 21 may include the side walls 21*d* and 21*e* extending in the first direction of the socket 20, and located outside the terminal holder 21*a* of the socket housing 21 in the second direction. Each of the second portions 24A2 and 24B2 of the shield members 24A and 24B of the socket 20 may include a third shield 24*f*3 covering the inner wall surface 21*d*2 or 21*e*2 of the associated one of the side wall connectors 21*d* or 21*e* of the socket 20. Each of the first portions 34A1 and 34B1 of the shield members 34A and 34B of the header 30 may include a fourth shield 34*f*4 covering the outer wall surface 31*d*1 or 31*e*1 of the associated one of the side wall connectors 31*d* or 31*e* of the header 30. Each of fourth shields 34*f*4 may include the projection 34*g* in contact with the associated one of the third shields 24*f*3.

In the connector according to one embodiment, the second portion 24A2 or 34A2 of the shield member 24A or 34A of at least one of the connector parts is aligned with the terminal holder 21*a* or 31*a* of the connector part in the second direction with a gap 51 or 52 interposed therebetween. At least a part of the terminal section 22A or 32A of the connector part may be located in the gap 51 or 52 between the shield member 24A or 34A of the connector part and the terminal holder 21*a* or 31*a* of the connector part as viewed in the third direction.

This configuration allows a visual check of the quality of soldering, which improves the yield in the soldering process.

In the connector according to an embodiment, in particular, when the slits do not overlap each other, each of the first and second portions 24A1 and 24A2 or 34A1 and 34A2 of the shield member 24A or 34A of the at least one of the connector parts may have the shield terminal 24*d* or 34*d* connectable to an external mount body.

With this configuration, the shield members of the connector parts have predetermined potentials.

Embodiment

An embodiment of the present disclosure will be described with reference to the drawings.

Overview of Connector

Figure 2:
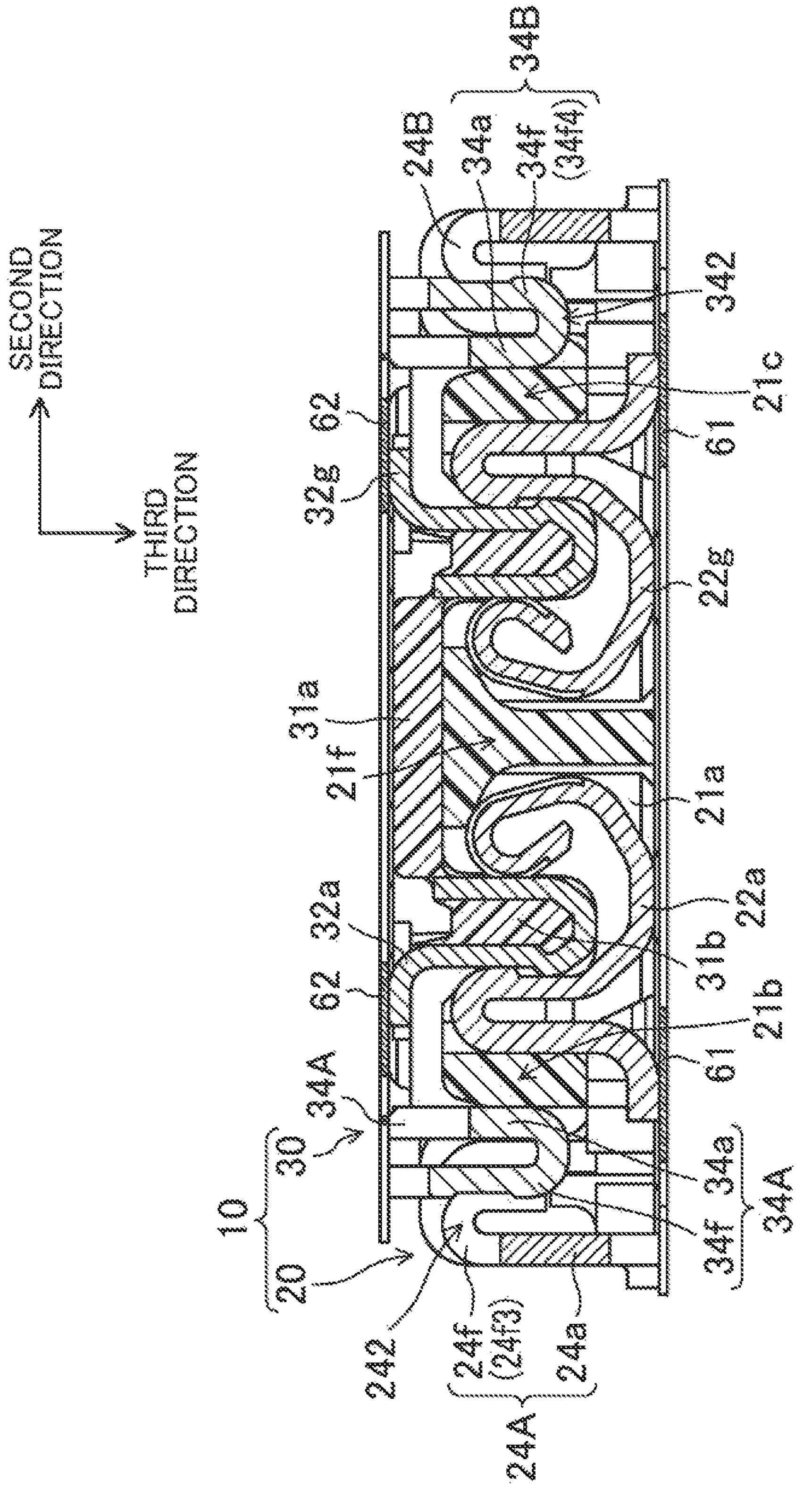
FIG. 2 is a cross-sectional view showing pads in the cross section taken along line II-II in FIG. 1.

FIGS. 1 and 2 show a connector according to this embodiment.

As shown in FIGS. 1 and 2, in a connector 10 according to this embodiment, a header 30 and a socket 20 are, inside the socket 20, fitted into each other while facing each other. Accordingly, corresponding terminals of the socket 20 and the header 30 come into contact with each other to be electrically connected to each other. The socket 20 and the header 30 are example connector parts.

As shown in FIG. 2, the socket 20 is electrically connected to pads 61, and the header 30 is electrically connected to pads 62. Each of the pads 61 and 62 includes wires on a wiring board or a circuit board, for example.

The socket 20 according to this embodiment includes a first socket shield member (i.e., a shield member) 24A and a second socket shield member (i.e., a shield member) 24B that cover almost the entire periphery of the socket 20. Similarly, the header 30 according to this embodiment includes a first header shield member (i.e., a shield member) 34A and a second header shield member (i.e., a shield member) 34B that cover almost the entire periphery of the header 30.

Now, detailed configurations of the socket 20 and the header 30 will be described with reference to the drawings.

Configuration of Socket

Figure 3:
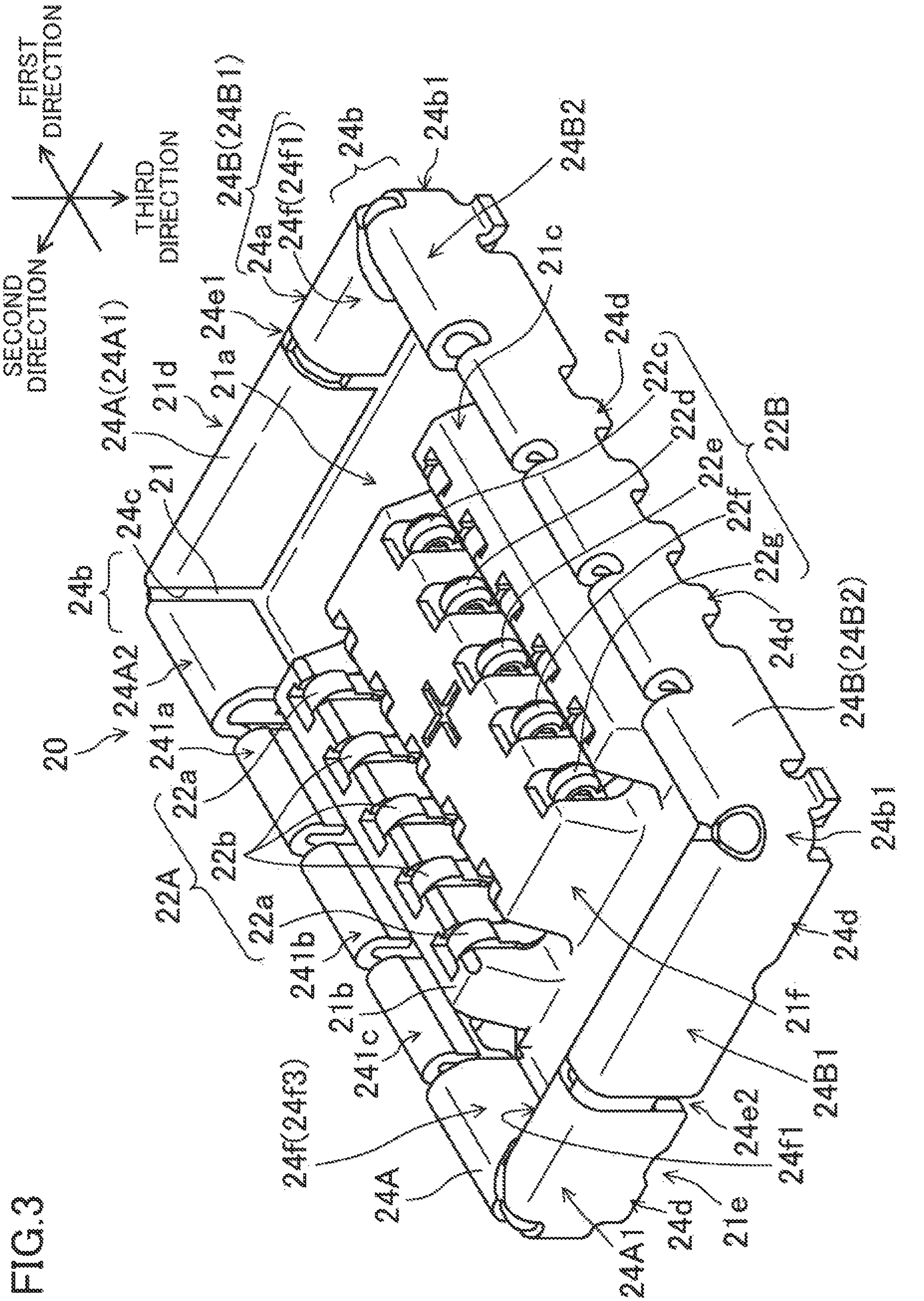
FIG. 3 is a perspective view of a socket according to the embodiment of the present disclosure.
Figure 4:
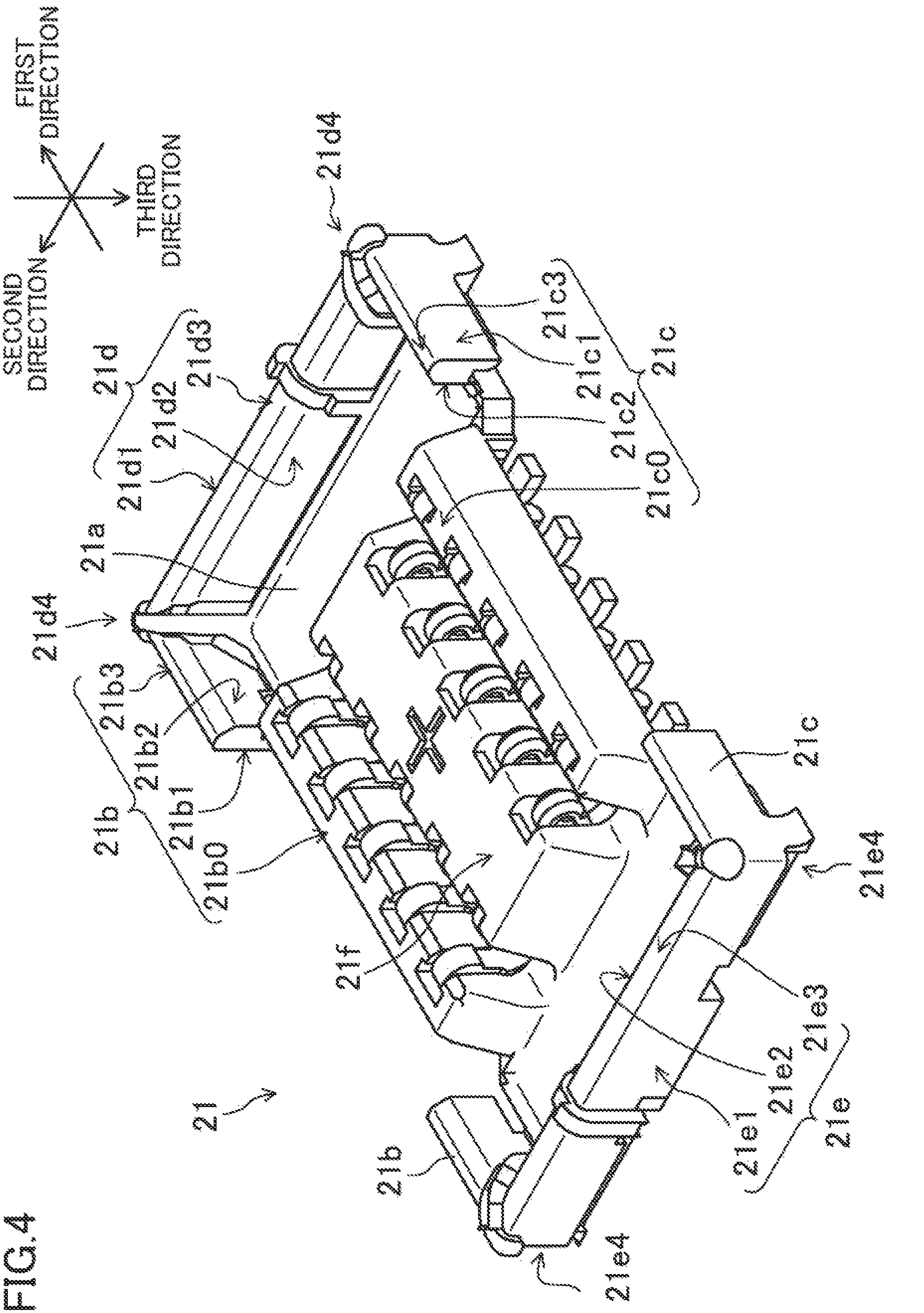
FIG. 4 is a perspective view of a socket housing according to the embodiment of the present disclosure.
Figure 5:
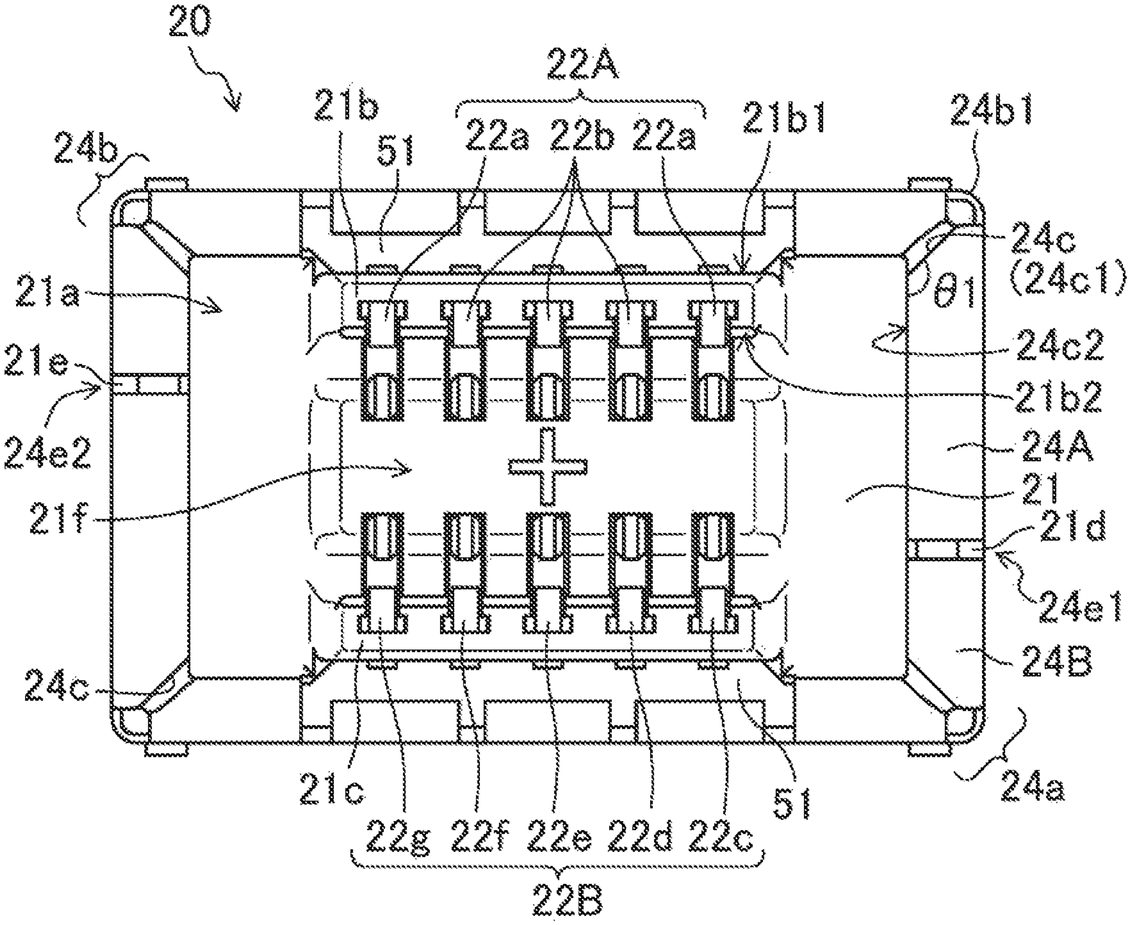
FIG. 5 is a top view of the socket according to the embodiment of the present disclosure.
Figure 6:
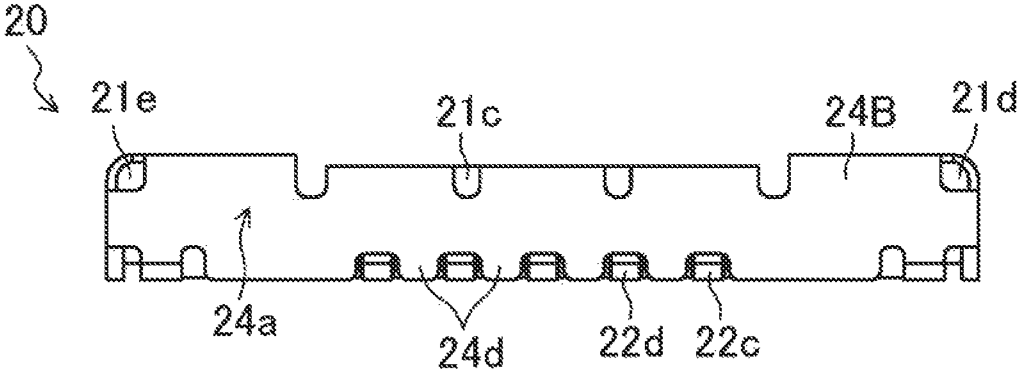
FIG. 6 is a front view of the socket according to the embodiment of the present disclosure.
Figure 7:
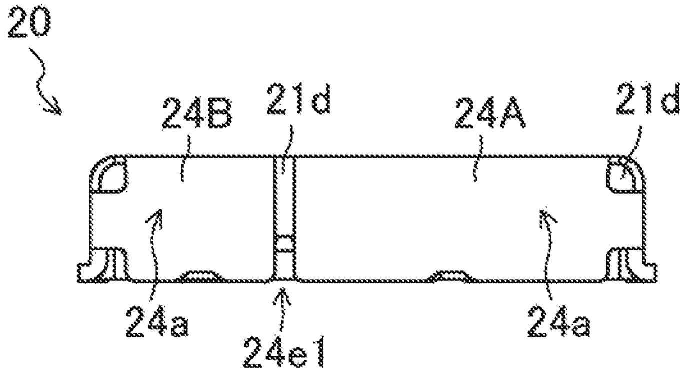
FIG. 7 is a right side view of the socket according to the embodiment of the present disclosure.

FIGS. 3 and 5 show the socket constituting the connector according to this embodiment and the socket shield members that cover the periphery of the socket. FIG. 4 shows the housing of the socket constituting the connector according to this embodiment. As shown in FIGS. 3 to 5, the socket 20 according to this embodiment includes a housing (hereinafter referred to as a "socket housing") 21. The housing 21 includes, for example, a terminal holder (or a bottom plate) 21*a* in a substantially rectangular planar shape, and side walls 21*b*, 21*c*, 21*d*, and 21*e* around the terminal holder. The terminal holder 21*a* has a terminal holding side wall 21*b*0 that holds a first socket terminal section (i.e., a terminal section) 22A, and a terminal holding side wall 21*c*0 that holds a second socket terminal section (i.e., a terminal section) 22B.

The side walls 21*b* and 21*c* extending along the long sides (i.e., in a first direction) and facing each other along the short sides (i.e., in a second direction) are hereinafter referred to as "socket side walls 21*b* and 21*c*" which correspond to the "side walls". On the other hand, the side walls 21*d* and 21*e* extending in the second direction, facing each other in the first direction, and connecting the socket side walls 21*b* and 21*c* are hereinafter referred to as "socket side wall connectors 21*d* and 21*e*" which correspond to the "side wall connectors". The socket side wall connectors 21*d* and 21*e* are connected to one end and the other end of the terminal holder 21*a*, respectively, in the first direction.

Now, a configuration of the socket housing 21 will be described with reference to FIG. 4.

As shown in FIG. 4, the socket side wall 21*b* has an outer wall surface 21*b*1, an inner wall surface 21*b*2, and an upper wall surface 21*b*3. The inner wall surface 21*b*2 is located opposite to the outer wall surface 21*b*1 and closer to the socket side wall 21*c* than the outer wall surface 21*b*1. The upper wall surface 21*b*3 connects the outer and inner wall surfaces 21*b*1 and 21*b*2 together.

Similarly, the socket side wall 21*c* has an outer wall surface 21*c*1, an inner wall surface 21*c*2, and an upper wall surface 21*c*3. The inner wall surface 21*c*2 is located opposite to the outer wall surface 21*c*1 and closer to the socket side wall 21*b* than the outer wall surface 21*c*1. The upper wall surface 21*c*3 connects the outer and inner wall surfaces 21*c*1 and 21*c*2 together.

The socket side wall connector 21*d* has an outer wall surface 21*d*1, an inner wall surface 21*d*2, and an upper wall surface 21*d*3. The outer wall surface 21*d*1 is connected to the outer wall surfaces 21*b*1 and 21*c*1 of the socket side walls 21*b* and 21*c*. The inner wall surface 21*d*2 is connected to the inner wall surfaces 21*b*2 and 21*c*2 of the socket side walls 21*b* and 21*c*. The upper wall surface 21*d*3 connects the outer and inner wall surfaces 21*d*1 and 21*d*2 together and is connected to the upper wall surfaces 21*b*3 and 21*c*3 of the socket side walls 21*b* and 21*c*.

The socket side wall connector 21*d* is connected to one end of the terminal holder 21*a* in the first direction. In the second direction, one end of the socket side wall connector 21*d* is connected to one end of the socket side wall 21*b*, while the other end is connected to one end of the socket side wall 21*c*. The terminal holder 21*a* is connected to the socket side wall connector 21*d* between both ends 21*d*4 of the socket side wall connector 21*d*. Each end 21*d*4 of the socket side wall connector 21*d* projects outward from one end of the terminal holder 21*a* in the second direction so that the socket side wall connector 21*d* and the terminal holder 21*a* form a T-shape. The socket side walls 21*b* and 21*c* connected to the socket side wall connector 21*d* are located outside the terminal holder 21*a* in the second direction.

Similarly, the socket side wall connector 21*e* has an outer wall surface 21*e*1, an inner wall surface 21*e*2, and an upper wall surface 21*e*3. The outer wall surface 21*e*1 is connected to the outer wall surfaces 21*b*1 and 21*c*1 of the socket side walls 21*b* and 21*c*. The inner wall surface 21*e*2 is connected to the inner wall surfaces 21*b*2 and 21*c*2 of the socket side walls 21*b* and 21*c*. The upper wall surface 21*e*3 connects the outer and inner wall surfaces 21*e*1 and 21*e*2 together and is connected to the upper wall surfaces 21*b*3 and 21*c*3 of the socket side walls 21*b* and 21*c*.

The socket side wall connector 21*e* is connected to the other end of the terminal holder 21*a* in the first direction. In the second direction, one end of the socket side wall connector is connected to the other end of the socket side wall 21*b*, while the other end is connected to the other end of the socket side wall 21*c*. The terminal holder 21*a* is connected to the socket side wall connector 21*e* between both ends 21*e*4 of the socket side wall connector 21*e*. Each end 21*e*4 of the socket side wall connector 21*e* projects outward from the other end of the terminal holder 21*a* in the second direction so that the socket side wall connector 21*e* and the terminal holder 21*a* form a T-shape. The socket side walls 21*b* and 21*c* connected to the socket side wall connector 21*e* are located outside the terminal holder 21*a* in the second direction. The portions of the socket side wall 21*b* connected to the socket side wall connectors 21*d* and 21*e* face each other in the first direction with a gap interposed therebetween. Similarly, portions of the socket side wall 21*c* connected to the socket side wall connectors 21*d* and 21*e* face each other in the first direction with a gap interposed therebetween.

Note that the socket housing 21 may be a molded article made of an insulating resin material, for example, a liquid crystal polymer (LCP).

As shown in FIGS. 3 and 5 to 8, the first and second socket terminal sections 22A and 22B are located in the socket side walls 21*b* and 21*c* of the socket housing 21, specifically, to face the terminal holding side wall 21*b*0 of the socket side wall 21*b* and the terminal holding side wall 21*c*0 of the socket side wall 21*c*, respectively.

The first socket terminal section 22A in the socket side wall 21*b* includes, for example, contacts (i.e., terminals) 22*a* at both ends of the socket side wall 21*b*, and three contacts 22*b* between the contacts 22*a*. On the other hand, the second socket terminal section 22B in the socket side wall 21*c* includes contacts 22*c*, 22*d*, 22*e*, 22*f*, and 22*g*, for example.

In this embodiment, as an example, what is called radio frequency (RF) signals may be applied to the contacts 22*a* of the first socket terminal section 22A, while ground potentials may be applied to the contacts 22*b*. On the other hand, signals with lower frequencies than the radio frequency (RF) signals to be applied to the contacts 22*a* and ground potentials may be applied to the contacts 22*c*, 22*d*, 22*e*, 22*f*, and 22*g* of the second socket terminal section 22B, as appropriate.

Note that any signal including the ground potential may be applied to the contacts 22*a* to 22*g*. The contacts 22*a* to 22*g* themselves have the same configuration. The configurations are however not necessarily the same in all respects.

Each of the upper surfaces (surfaces facing the header 30) of the contacts 22*a* to 22*g* may include a gold (Au) plating layer with a thickness of 0.06 μm or less, for example. Accordingly, it becomes difficult for a solder material to reach the upper surfaces of the contacts 22*a* to 22*g* when soldering the lower surfaces (surfaces facing the pad 61) of the contacts 22*a* to 22*g*. Since no excessive solder material adheres to the upper surfaces of the contacts, the radio frequency characteristics stabilize.

As shown in FIGS. 2 to 5, the socket housing 21 has a holding wall 21*f* in a region of the terminal holder 21*a* between the socket side walls 21*b* and 21*c*. The holding wall 21*f* holds the contacts 22*a* and 22*b* of the first socket terminal section 22A extending from the socket side wall 21*b* toward the socket side wall 21*c*. The holding wall 21*f* also holds the contacts 22*c* to 22*g* of the second socket terminal section 22B extending from the socket side wall 21*c* toward the socket side wall 21*b*. The holding wall 21*f* is integrally molded with, for example, the socket housing 21, namely, the terminal holder 21*a*.

Figure 8:
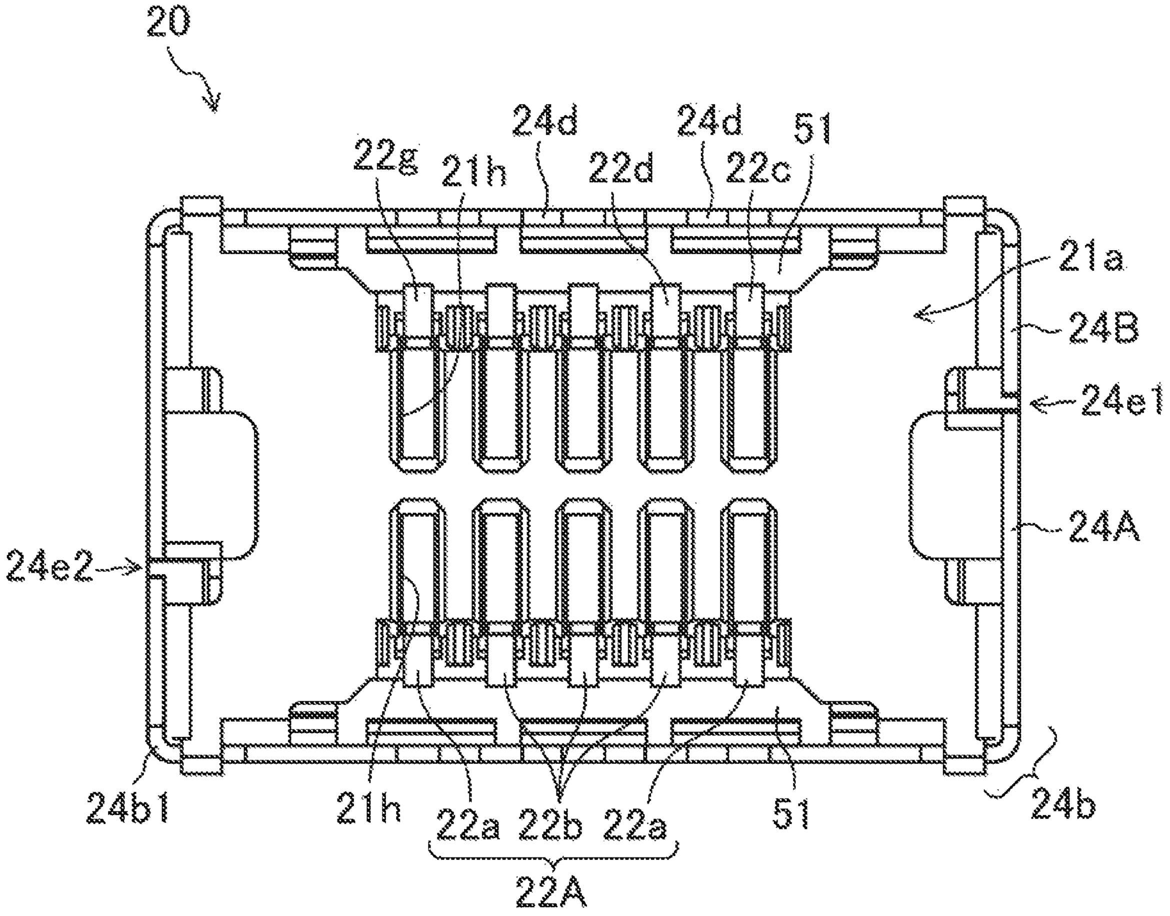
FIG. 8 is a bottom view of the socket according to the embodiment of the present disclosure.

In this embodiment, as shown in FIG. 8, the lower parts of the contacts 22*a* to 22*g* are located inside holes 21*h* in the terminal holder 21*a* of the socket housing 21. In addition, the contacts 22*a* have a smaller thickness (in a third direction in FIG. 2) than the terminal holder 21*a*. Thus, as shown in FIG. 2, the lower parts (i.e., the tops) of posts (i.e., terminals) 32*a* of the header 30 fitted into the socket 20 come into contact with the upper surface of the terminal holder 21*a* of the socket 20 and stops. That is, the tops of the posts 32*a* do not interfere with the upper surfaces of the contacts 22*a*. As a result, the height (in the vertical direction in FIG. 2) of the connector 10 in which the socket 20 and the header 30 are fitted into each other is not affected by the lower parts of the contacts 22*a*.

Note that the holes 21*h* that are located in the terminal holder 21*a* of the socket housing 21 and receive at least the lower parts of the second contacts 22*b*, for example, fitted therein are not necessarily the holes penetrating the terminal holder 21*a*. Specifically, the holes may be grooves formed from the upper surface of the terminal holder 21*a*. However, even when the holes 21*h* are the grooves, the upper surfaces of the second contacts 22*b* inside the grooves need to be located lower than the upper surface of the terminal holder 21*a*. The details of the posts 32*a* of the header 30 will be described later.

In this embodiment, as shown in FIG. 5, the socket terminal sections 22A and 22B of the socket 20 are located in the two facing socket side walls 21*b* and 21*c*, respectively. The configuration is not limited thereto. For example, only one of the socket side walls may have the socket terminal section 22A or 22B. In this case, only one of the header terminal sections 32A or 32B of the header 30 may be provided in correspondence to the socket terminal section.

Configuration of Socket Shield Member

As shown in FIGS. 3 and 5 to 8, the first socket shield member 24A according to this embodiment includes a second portion 24A2 and first portions 24A1. The second portion 24A2 covers the socket side wall 21*b* of the socket housing 21. Each first portion 24A1 covers a part of the associated one of the socket side wall connectors 21*d* or 21*e*. Similarly, the second socket shield member 24B includes a second portion 24B2 and first portions 24B1. The second portion 24B2 covers the socket side wall 21*c* of the socket housing 21. Each first portion 24B1 covers the rest part of the associated one of the socket side wall connectors 21*d* or 21*e*.

Specifically, as shown in FIGS. 5 to 8, the second portion 24A2 of the first socket shield member 24A faces the terminal holding side wall 21*b*0 of the socket side wall 21*b* with a gap (i.e., void) 51 interposed therebetween. In addition, each of the first portions 24A1 of the first socket shield member 24A is held by at least a part of the associated one of the socket side wall connectors 21*d* or 21*e*. Specifically, one of the first portions 24A1 of the first socket shield member 24A is integrally molded with and fixed to the socket side wall connector 21*d*. When the socket side walls 21*b* and 21*c* are provided, the second portion 24A2 of the first socket shield member 24A may be held by the socket side wall 21*b*.

Similarly, the second socket shield member 24B faces the terminal holding side wall 21*c*0 of the socket side wall 21*c* with a gap (i.e., void) 51 interposed therebetween. Each of the first portions 24B1 of the second socket shield member 24B is held by the rest part of the associated one of the socket side wall connectors 21*d* or 21*e*. When the socket side walls 21*b* and 21*c* are provided, the second portion 24B2 of the second socket shield member 24B may be held by the socket side walls 21*b* and 21*c*. Specifically, the second portion 24B2 of the second socket shield member 24B is integrally molded with and fixed to the socket side walls 21*b* and 21*c*.

Now, an example holding structure of the socket shield members will be described with reference to FIGS. 3 and 4. For example, the socket shield member 24A includes a shield connector 24*b* at each of the connecting points between the socket side wall 21*b* and the socket side wall connectors 21*d* and 21*e*. Each shield connector 24*b* covers the upper wall surface 21*b*3 of the socket side wall 21*b* and the outer wall surface 21*d*1 or 21*e*1 of the associated one of the socket side wall connectors 21*d* or 21*e*.

Each shield connector 24*b* is located at one of the corners of the socket side wall connectors 21*d* and 21*e*. Each shield connector 24*b* includes a cutout 24*c* for bending and a connection portion 24*b*1. The cutouts 24*c* are cut out in the direction from the connecting points between the inner wall surface 21*b*2 of the socket side wall 21*b* and the inner wall surfaces 21*d*2 and 21*e*2 of the socket side wall connectors 21*d* and 21*e*, respectively, to the connecting points between the upper wall surface 21*b*3 of the socket side wall 21*b* and the upper wall surfaces 21*d*3 and 21*e*3 of the socket side wall connectors 21*d* and 21*e*, respectively. The connection portions 24*b*1 face the connecting points between the outer wall surface 21*b*1 of the socket side wall 21*b* and the outer wall surfaces 21*d*1 and 21*e*1 of the socket side wall connectors 21*d* and 21*e*, respectively. The cutouts 24*c* may be located at the connecting points between the outer wall surface 21*b*1 of the socket side wall 21*b* and the outer wall surfaces 21*d*1 and 21*e*1 of the socket side wall connectors 21*d* and 21*e*, respectively.

This holding structure also applies to the socket shield member 24B.

As described above, the socket shield members 24A and 24B may be configured in two pieces. Here, the holding regions on the socket side wall connectors 21*d* and 21*e* of the socket shield members 24A and 24B have slits 24*e*1 and 24*e*2 (i.e., first shield gaps), respectively. This two-piece structure facilitates the processing and assembly of the socket shield members 24A and 24B.

The slits 24*e*1 and 24*e*2 between the socket shield members 24A and 24B do not overlap each other in the first direction.

Here, the socket shield members 24A and 24B may be formed as follows. The regions covering the socket side wall connectors 21*d* and 21*e* including, for example, the regions of the socket side walls 21*b* and 21*c* holding the socket shield members 24A and 24B may be formed by insert molding. The socket shield members 24A and 24B may be formed on the socket housing 21 by press-fitting.

In this manner, the socket shield members 24A and 24B according to this embodiment cover almost the entire peripheries of the socket terminal sections 22A and 22B in the socket 20. This configuration further reduces unnecessary radiation and noise caused by the RF signals.

As shown in FIG. 3, the socket shield members 24A and 24B include a plurality of shield terminals 24*d* at the lower end of the shield body 24*a* in at least one of the first or second portion 24A1 or 24A2. The shield terminals 24*d* are connectable to the circuit board or any other board that is a mount body, when the socket 20 is mounted on the circuit board, for example. Accordingly, the socket 20 is electrically and mechanically connectable to the circuit board, for example, by the shield terminals 24*d* of the socket shield members 24A and 24B.

These shield terminals 24*d* may be grounded to, for example, the pad 61 such as a circuit board. In this manner, the socket shield members 24A and 24B include, in a plurality of locations, for example, four locations, the shield terminals 24*d* for grounding. This reduces the interval between these shield terminals 24*d*. This configuration further reduces unnecessary radiation and noise caused by the RF signals.

The socket shield members 24A and 24B may be made of a material such as a known metal plate, for example, a metal material such as a copper alloy.

In this embodiment, as shown in FIG. 2, in the socket 20, the outer ends for mounting, of the contacts 22*a* and 22*g* are located inside the socket shield members 24A and 24B, respectively. Accordingly, the pad 61 such as a circuit board is also located inside the socket shield members 24A and 24B.

In this configuration, almost the entire peripheries of both the contacts 22*a* to 22*g* and the pad 61 such as a circuit board are covered by the socket shield members 24A and 24B, which further reduces unnecessary radiation and noise caused by the RF signals.

Note that the arrangement of the contacts 22*a* to 22*g* inside the socket shield members 24A and 24B may be applied to at least the contacts 22*a* to which the RF signals are applied.

As shown in FIG. 5, the socket 20 according to this embodiment has, as described above, the gap (i.e., void) 51 on each of the surfaces on which the socket side walls 21*b* and 21*c* face the socket shield members 24A and 24B. With this configuration, the ends for mounting, of the contacts 22*a* to 22*g* are exposed between the socket shield members 24A and 24B and the socket side walls 21*b* and 21*c*, respectively, in a top view from the plane facing the header 30, for example. That is, some of the contacts 22*a* to 22*g* are visible through the gaps 51.

Figure 9:
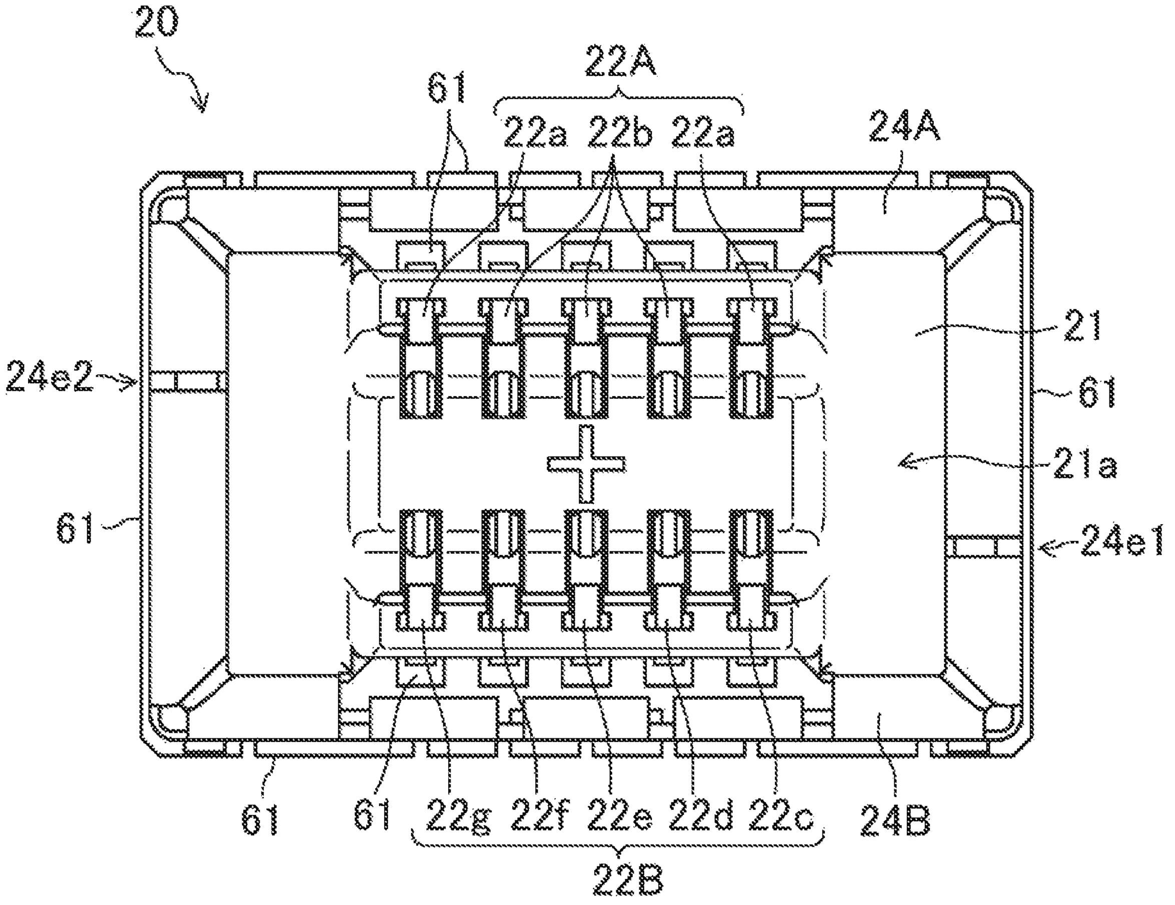
FIG. 9 is a top view showing the socket on a pad according to the embodiment of the present disclosure.

As shown in FIG. 9, this configuration allows a visual check of the quality of soldering between the pad 61 and the contacts 22*a* to 22*g* in the process of soldering therebetween. Accordingly, the yield improves in the soldering process.

Figure 10:
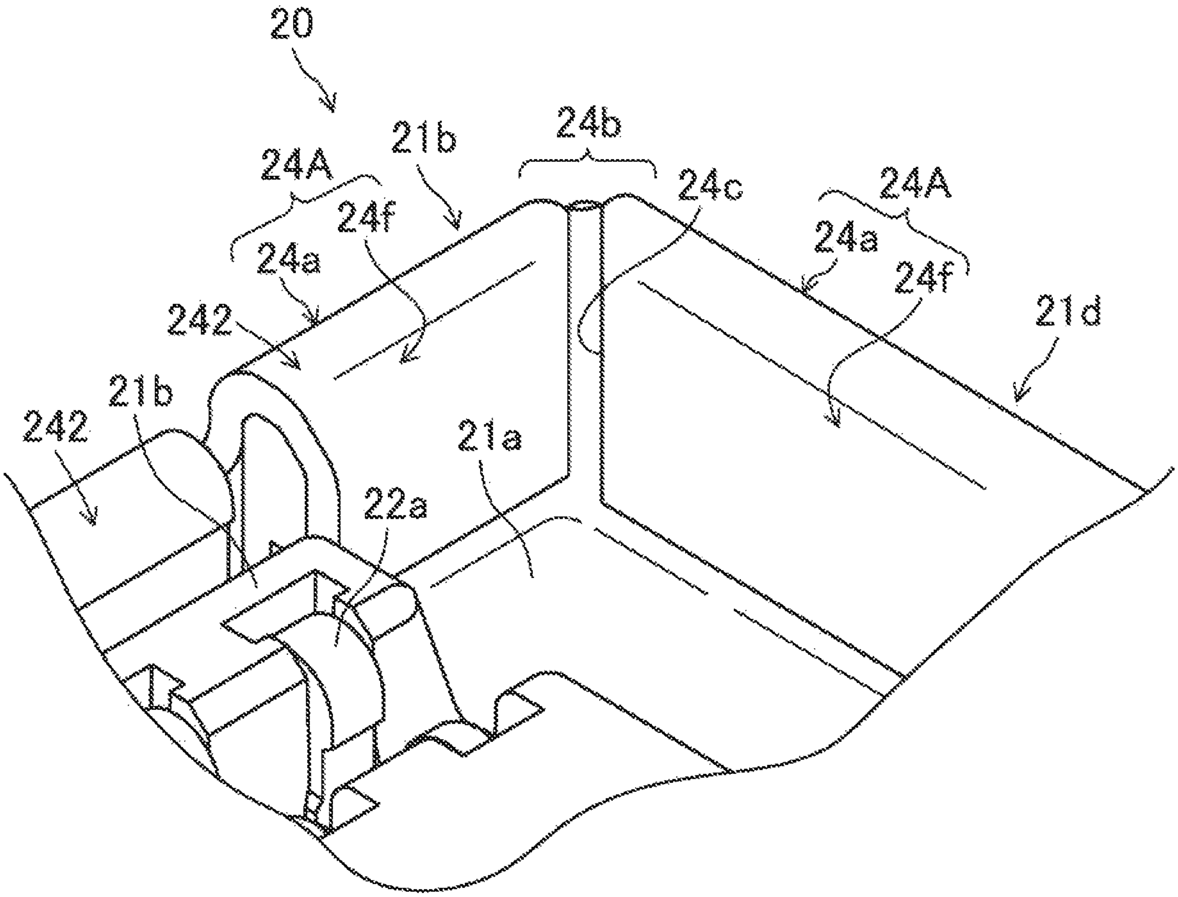
FIG. 10 is an enlarged partial perspective view of a corner of the socket according to the embodiment of the present disclosure.

As shown in FIGS. 2, 3, and 10, in this embodiment, each of the second portion 24A2 of the first socket shield member 24A and the second portion 24B2 of the second socket shield member 24B has a U-shaped cross section in the direction (i.e., the second direction) perpendicular to the direction in which the socket side walls 21*b* and 21*c* extend. Specifically, the second portion 24A2 of the first socket shield member 24A includes a shield body 24*a* and a shield bent portion 24*f*.

The shield bent portion 24*f* of the second portion 24A2 is connected to the shield body 24*a* and bent to be closer to the socket side wall 21*b* than the shield body 24*a* so as to have a curved portion 242 closer to the header 30 to be inserted.

The curved portion 242 of the shield bent portion 24*f* of the second portion 24A2 has a ridge extending in the first direction. That is, the radius center of the arc of the curved portion 242 is located farther from the header 30 to be inserted (i.e., lower) than the apex (i.e., the ridge) of the curved portion 242. In addition, the curved portion 242 is located at the top of the second portion 24B2 closer to the header 30 to be inserted.

The shield body 24*a* of the second portion 24A2 has side walls extending in the second and third directions. The shield bent portion 24*f* of the second portion 24A2 has side walls extending in the second and third directions. The side walls of the shield body 24*a* and the shield bent portion 24*f* are connected together via the curved portion 242.

The portion of the socket side wall 21*c* connected to the socket side wall connector 21*d* faces the portion of the socket side wall 21*c* connected to the socket side wall connector 21*e* in the first direction in a region. In this region, the side walls of the shield body 24*a* and the shield bent portion 24*f* face each other with a gap (or a void) interposed therebetween.

Specifically, the first, second, and third directions are orthogonal to each other.

The second portion 24A2 of the shield bent portion 24*f* includes a plurality of pieces 241*a* to 241*c* in the direction (i.e., the first direction) in which the first socket terminal section 22A extends. Slits are provided between adjacent pairs of the pieces 241*a* to 241*c*. The pieces 241*a* to 241*c* are flexible, that is, bendable. In this embodiment, a second portion 34A2 of the shield bent portion 34*f* of the header 30, which will be described later, includes no piece but may include a plurality of pieces.

Each first portion 24A1 of the first socket shield member 24A includes a shield body **24*a* and a shield bent portion 24*f*. The shield bent portion 24*f* of the first portion 24A1 is connected to the shield body 24*a* of the first portion 24A1 and bent from the shield body 24*a* toward the terminal holder 21*a* so as to have a curved portion 242 closer to the header 30 to be inserted. Each of the shield bent portions 24*f* of the first portions 24A1 is fixed to the associated one of the socket side wall connectors 21*d* or 21*e***.

The shield body **24*a* of each first portion 24A1 covers the associated one of the outer wall surfaces 21*d*1 or 21*e*1 which is an outer surface of the socket side wall connector 21*d* or 21*e* in the first direction. The shield bent portion 24*f* of each first portion 24A1 has a side wall (i.e., a first shield 24*f*1) covering the inner wall surfaces 21*d*2 and 21*e*2 of the associated one of the socket side wall connectors 21*d* or 21*e***.

In the second portion 24A2 of the first socket shield member 24A, the side wall of the shield bent portion **24*f* covering the inner wall surface 21*b*2 at both ends of the socket side wall connectors 21*d* and 21*e* in the first direction is referred to as a "third shield 24*f*3". The same applies to the first and second portions 24B1 and 24B2 of the second socket shield member 24B**.

Similarly, the second socket shield member 24B includes a shield body **24*a* and a shield bent portion 24*f* being bent toward the socket side wall 21*c***.

As shown in FIG. 5, in this embodiment, in each shield connector **24*b* of the first socket shield member 24A connected to the socket side wall connectors 21*d* and 21*e*, as viewed in the third direction (i.e., in a top view), at the edge 24*c*1 and opening of the associated cutout 24*c*, an outer edge 24*c*2 connected to the edge 24*c*1 forms an angle θ1 greater than 90°. This also applies to the shield connectors 24*b* of the second socket shield member 24B connected to the socket side wall connectors 21*d* and 21*e***.

This configuration reduces the gap of each cutout **24*c* as compared to the case where the outer edge 24*c*2 connected to the edge 24*c*1 forms an angle θ1 smaller than or equal to 90° at the edge 24*c*1 and opening of the cutout 24*c***. The employment of this configuration further reduces unnecessary radiation and noise caused by the RF signals.

Configuration of Header

Figure 11:
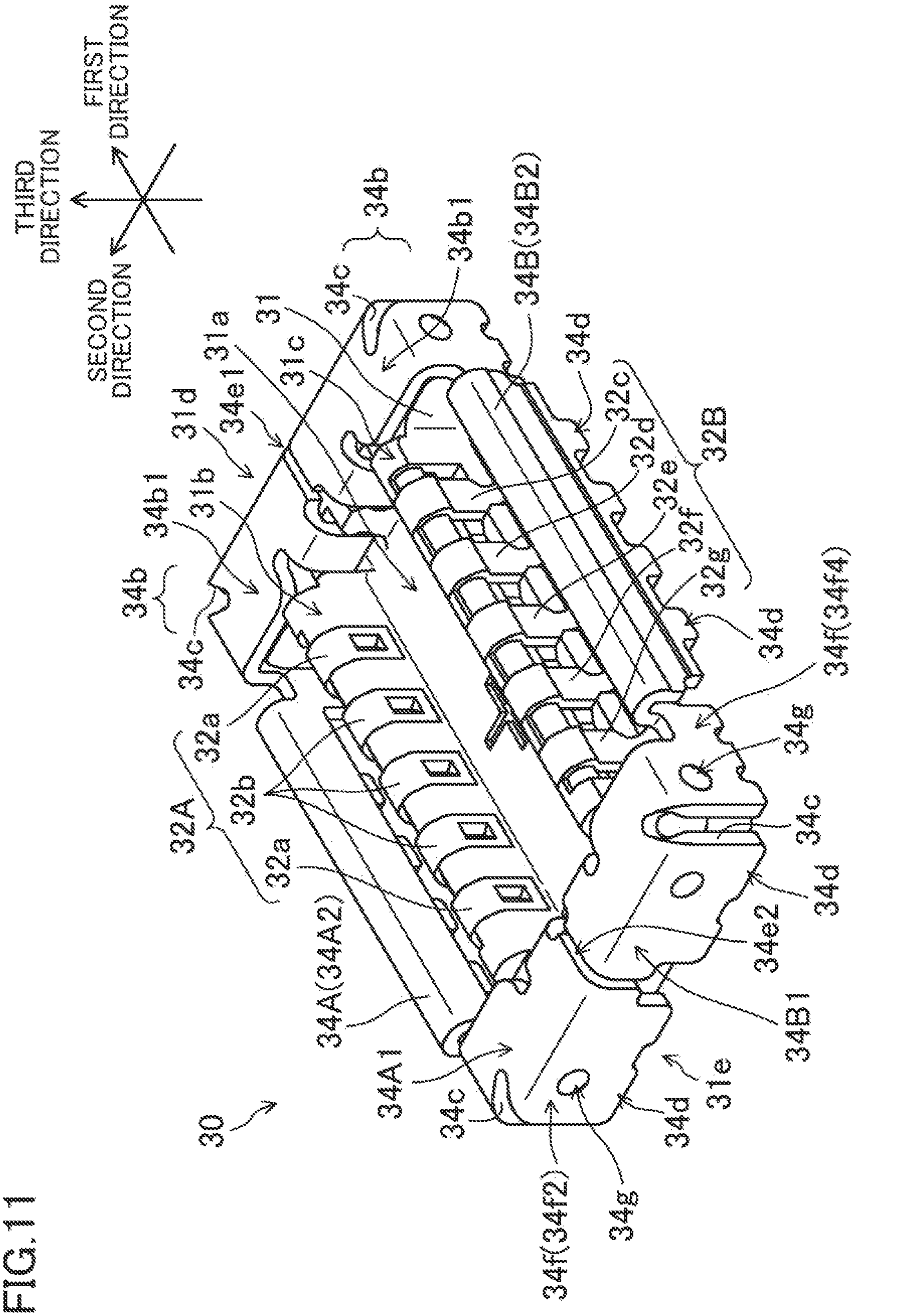
FIG. 11 is a perspective view of a header according to the embodiment of the present disclosure.
Figure 13:
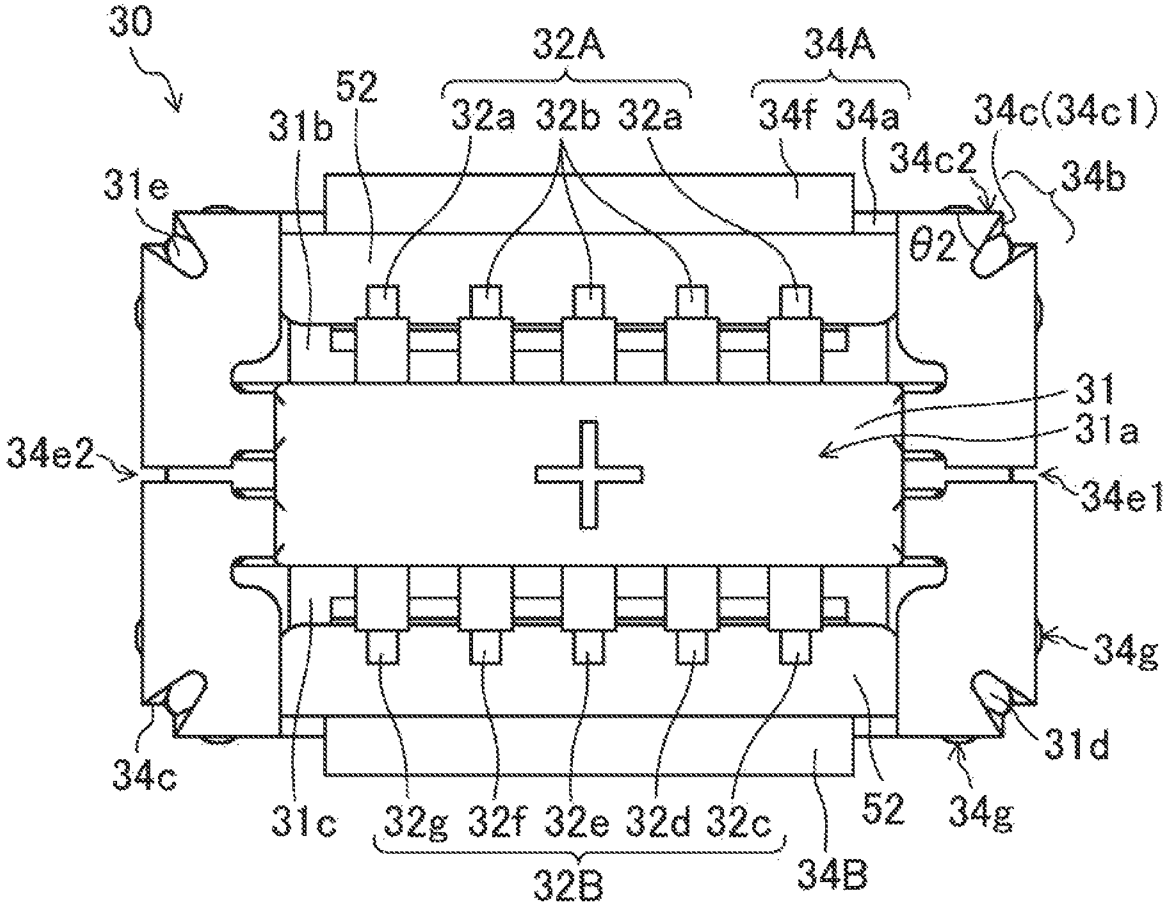
FIG. 13 is a top view of the header according to the embodiment of the present disclosure.

FIGS. 11 and 13 show the header constituting the connector according to this embodiment and the header shield members that cover the periphery of the header.

As shown in FIGS. 11 and 13, the header 30 according to this embodiment includes a housing (hereinafter referred to as a "header housing") 31. The housing 31 includes, for example, a terminal holder **31*a* in a substantially rectangular planar shape. The terminal holder 31*a* has a terminal holding side wall 31*b* that holds a first header terminal section (i.e., a terminal section) 32A and a terminal holding side wall 31*c* that holds a second socket terminal section (i.e., a terminal section) 32B**.

The header housing 31 has side walls **31*d* and 31*e* facing each other in the first direction and connecting both ends of the terminal holder 31*a*. The side walls 31*d* and 31*e* are hereinafter referred to as "header side wall connectors 31*d* and 31*e*" which correspond to the "side wall connectors". The header side wall connectors 31*d* and 31*e* are connected to one end and the other end of the terminal holder 31*a***, respectively, in the first direction.

The terminal holder **31*a* is connected to the header side wall connector 31*d* between both ends 31*d*4 of the header side wall connector 31*d*. Each end 31*d*4 of the header side wall connector 31*d* projects outward from one end of the terminal holder 31*a* in the second direction so that the header side wall connector 31*d* and the terminal holder 31*a*** form a T-shape.

Now, a configuration of the header housing 31 will be described with reference to FIG. 12.

Figure 12:
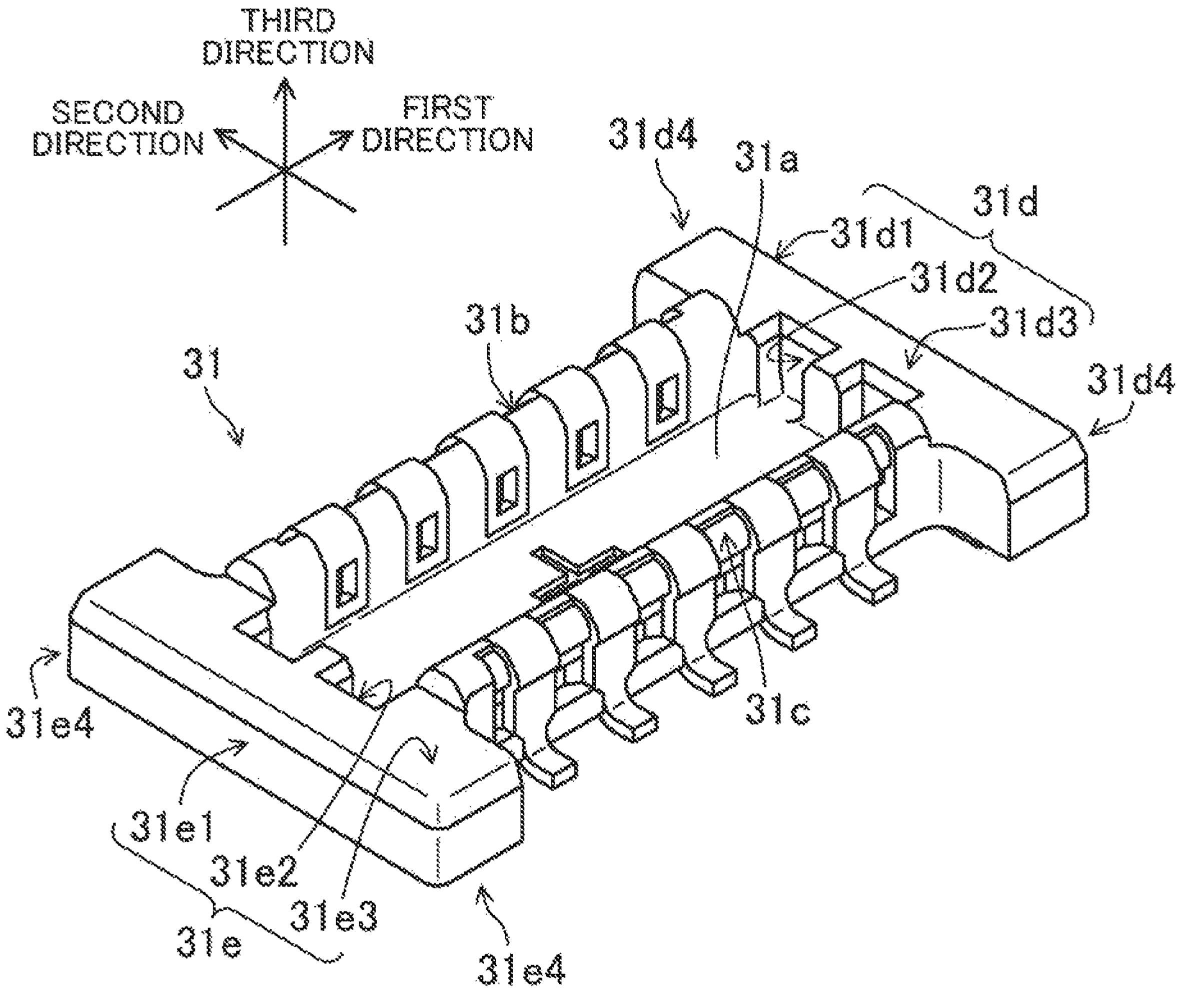
FIG. 12 is a perspective view of a header housing according to the embodiment of the present disclosure.

As shown in FIG. 12, the terminal holding side wall **31*b* holds the first header terminal section 32A as described above. The terminal holding side wall 31*c* holds the second header terminal section 32B**.

The header side wall connector **31*d* has an inner wall surface 31*d*2 and an upper wall surface 31*d*3. The inner wall surface 31*d*2 is connected to the terminal holding side walls 31*b* and 31*c*. The upper wall surface 31*d*3 connects the outer and inner wall surfaces 31*d*1 and 31*d*2 together and is connected to the terminal holding side walls 31*b* and 31*c***.

Similarly, the header side wall connector **31*e* has an inner wall surface 31*e*2 and an upper wall surface 31*e*3. The inner wall surface 31*e*2 is connected to the terminal holding side walls 31*b* and 31*c*. The upper wall surface 31*e*3 connects the outer and inner wall surfaces 31*e*1 and 31*e*2 together and is connected to the terminal holding side walls 31*b* and 31*c***.

Like the socket housing 21, the header housing 31 is also a molded article made of a liquid crystal polymer (LCP) that is an insulating resin material.

Figure 14:
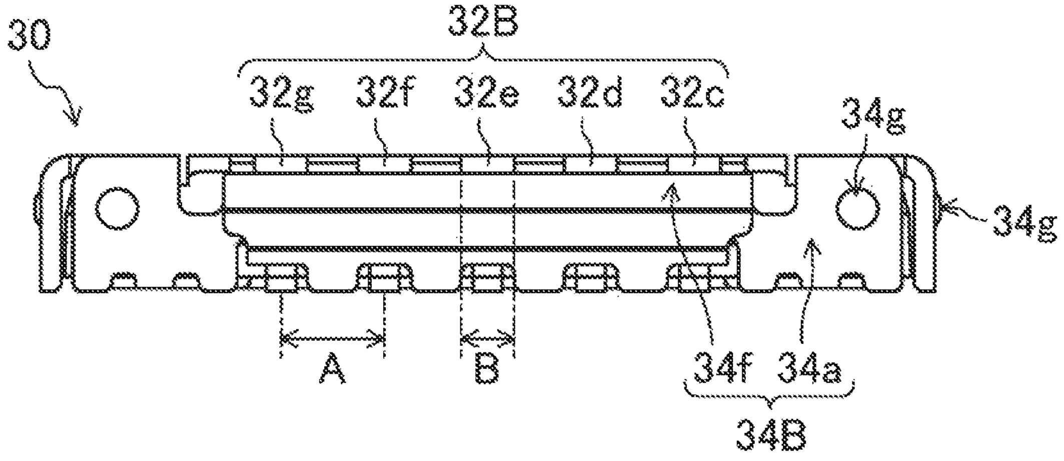
FIG. 14 is a front view of the header according to the embodiment of the present disclosure.
Figure 15:
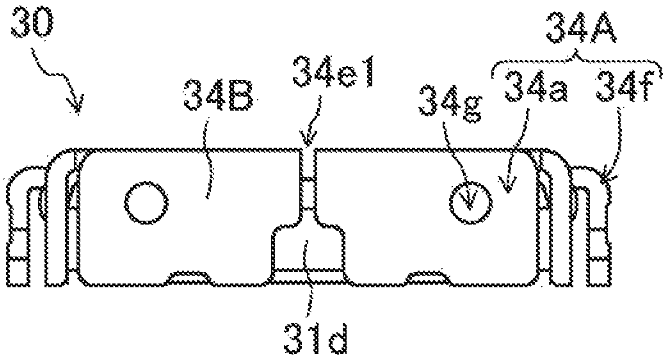
FIG. 15 is a right side view of the header according to the embodiment of the present disclosure.

As shown in FIGS. 11, 13, and 14, the first header terminal section 32A in the terminal holding side wall **31*b* includes, for example, posts (terminals) 32*a* at both ends of the terminal holding side wall 31*b*, and three posts 32*b* between the posts 32*a*. On the other hand, the second header terminal section 32B in the terminal holding side wall 31*c* includes posts 32*c*, 32*d*, 32*e*, 32*f*, and 32*g***, for example.

The posts **32*a* to 32*g* themselves have the same configuration (or shape). The configurations are however not necessarily the same in all respects as long as excellent electrical connection is established with the contacts 22*a* and 22*b***.

Each of the upper surfaces (surfaces facing the socket 20) of the posts **32*a* to 32*g* may include a gold (Au) plating layer with a thickness of 0.06 μm or less, for example. Accordingly, it becomes difficult for a solder material to reach the upper surfaces of the posts 32*a* to 32*g* when soldering the lower surfaces (surfaces facing the pad 62) of the posts 32*a* to 32*g***. Since no excessive solder material adheres to the upper surfaces of the posts, the radio frequency characteristics stabilize.

Configuration of Header Shield Member

As shown in FIGS. 11 and 13 to 16, the first header shield member 34A according to this embodiment includes the second portion 34A2 and first portions 34A1. The second portion 34A2 covers the terminal holding side wall **31*b* of the header housing 31. Each of the first portions 34A1 covers a part of the associated one of the header side wall connectors 31*d* or 31*e*. Similarly, the second header shield member 34B includes a second portion 34B2 and first portions 34B1. The second portion 34B2 covers the terminal holding side wall 31*c* of the header housing 31. Each of the first portions 34B1 covers the rest part of the associated one of the header side wall connectors 31*d* or 31*e***.

Specifically, as shown in FIGS. 13 to 16, the second portion 34A2 of the first header shield member 34A faces the terminal holding side wall **31*b* with a gap (i.e., void) 52 interposed therebetween. Each first portion 34A1 of the first header shield member 34A is held by the associated one of the header side wall connectors 31***d* or 31*e* in a region that is about a half the size of the header side wall connectors 31*d* and 31*e*.

More specifically, one of the first portions 34A1 of the first header shield member 34A is integrally molded with and fixed to the header side wall connector 31*d*.

Now, an example holding structure of the header shield members will be described with reference to FIGS. 11 and 12. For example, the first header shield member 34A includes a shield connector 34*b* at each of the connecting points between the terminal holding side wall 31*b* and the header side wall connectors 31*d* and 31*e*. The shield connector 34*b* covers the outer wall surface 31*d*1 or 31*e*1 and the upper wall surface 31*d*3 or 31*e*3 of the associated one of the header side wall connectors 31*d* or 31*e*.

The shield connector 34*b* includes a connection portion 34*b*1 and a cutout 34*c* for bending. The connection portions 34*b*1 connect the outer wall surfaces 31*d*1 and 31*e*1 to the upper wall surfaces 31*d*3 and 31*e*3 of the header side wall connectors 31*d* and 31*e*, respectively. The cutouts 34*c* are cut out toward the connecting points between the outer wall surface 31*d*1 and 31*e*1 and the upper wall surfaces 31*d*3 and 31*e*3 of the header side wall connectors 31*d* and 31*e*, respectively.

This holding structure also applies to the header shield member 34B.

In this manner, the header shield members 34A and 34B may also be configured in two pieces. In the header side wall connectors 31*d* and 31*e*, the first portions 34A1 and 34B1 of the header shield members 34A and 34B have slits 34*e*1 and 34*e*2 (i.e., second shield gaps), respectively.

The slits 34*e*1 and 34*e*2 between the header shield members 34A and 34B overlap each other in the first direction.

Figure 18:
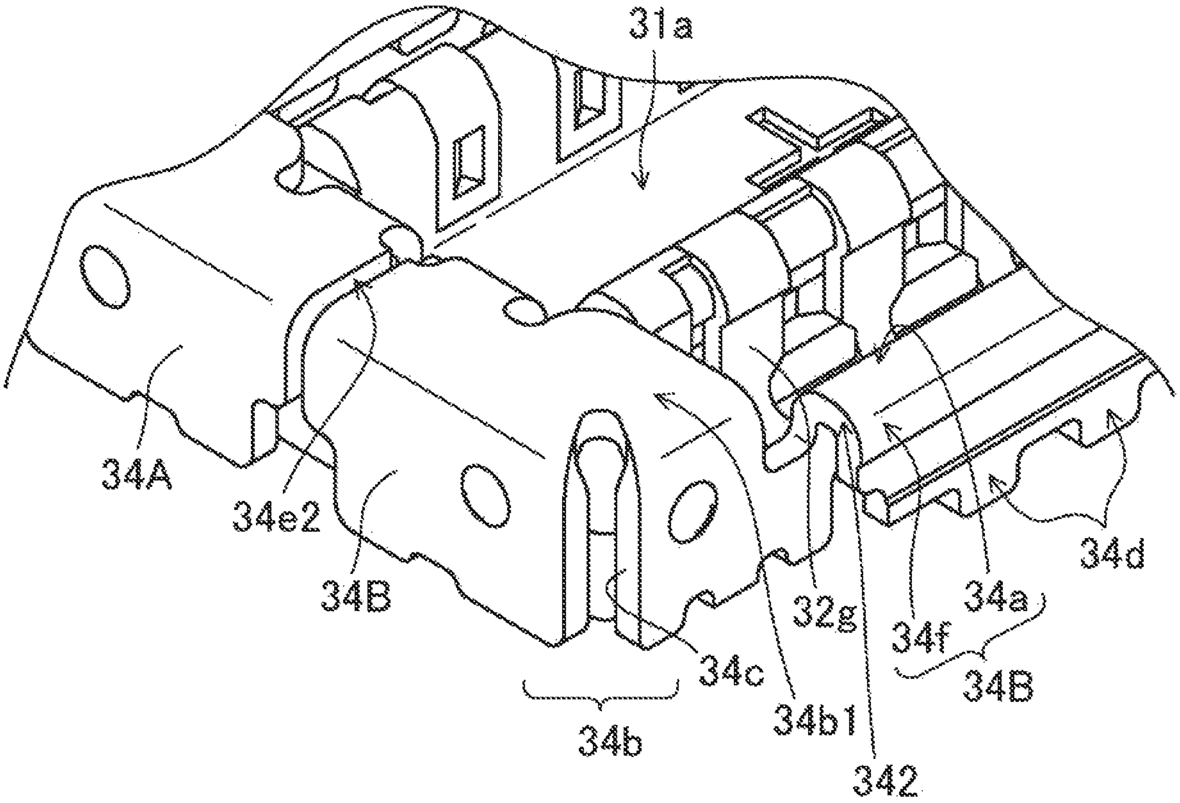
FIG. 18 is an enlarged partial perspective view of a corner of the header according to the embodiment of the present disclosure.

As shown in FIGS. 18 and 3, the cutouts 34*c* of the shield connectors 34*b* of the header shield members 34A and 34B overlap the respective connection portions 24*b*1 of the shield connectors 24*b* of the socket shield members 24A and 24B. Accordingly, at least a part of each of the cutouts 34*c* of the header shield members 34A and 34B is shielded by the connection portions 24*b*1 of the associated one of the socket shield members 24A or 24B, which improves the shielding effect.

Note that the regions covering the header side wall connectors 31*d* and 31*e* of the header shield members 34A and 34B, for example, may be formed by insert molding. Alternatively, the socket shield members may be formed by press-fitting.

In this manner, the header shield members 34A and 34B according to this embodiment cover almost the entire peripheries of the header terminal sections 32A and 32B provided in the header 30. This configuration further reduces unnecessary radiation and noise caused by the RF signals.

As shown in FIG. 11, each of the header shield members 34A and 34B includes a plurality of shield terminals 34*d*. The shield terminals 34*d* are connectable to the wiring board or any other board that is a mount body, when the header 30 is mounted on the wiring board, for example. Accordingly, the header 30 is electrically and mechanically connectable to the wiring board, for example, by the shield terminals 34*d* of the header shield members 34A and 34B.

These shield terminals 34*d* may be grounded to, for example, the pad 62 such as a wiring board. In this manner, the header shield members 34A and 34B include, in a plurality of locations, the shield terminals 34*d* for grounding. This reduces the interval between these shield terminals 34*d*. This configuration further reduces unnecessary radiation and noise caused by the RF signals.

Note that the header shield members 34A and 34B may be made of a material equivalent to the socket shield members 24A and 24B, for example, a metal material such as a copper alloy.

In this embodiment, as shown in FIG. 2, in the header 30 as well, the respective outer ends for mounting, of the posts 32*a* and 32*g* are located inside the header shield members 34A and 34B. Accordingly, the pad 62 such as a wiring board is also located inside the header shield members 34A and 34B.

In this configuration, almost the entire peripheries of both the posts 32*a* to 32*g* and the pad 62 such as a wiring board are covered by the header shield members 34A and 34B, which further reduces unnecessary radiation and noise caused by the RF signals.

Note that the arrangement of the posts 32*a* to 32*g* inside the header shield members 34A and 34B may be applied to at least, for example, the posts 32*a* to which the RF signals are applied.

As shown in FIG. 13, the header 30 according to this embodiment has, as described above, the gap (i.e., void) 52 on each of the planes on which the terminal holding side walls 31*b* and 31*c* face the header shield members 34A and 34B, respectively. With this configuration, the ends for mounting, of the posts 32*a* to 32*g* are exposed between the header shield member 34A and the terminal holding side wall 31*b* and between the header shield member 34B and the terminal holding side wall 31*c*, in a top view from the plane facing the socket 20, for example. That is, some of the posts 32*a* to 32*g* are visible through the gaps 52.

Figure 17:
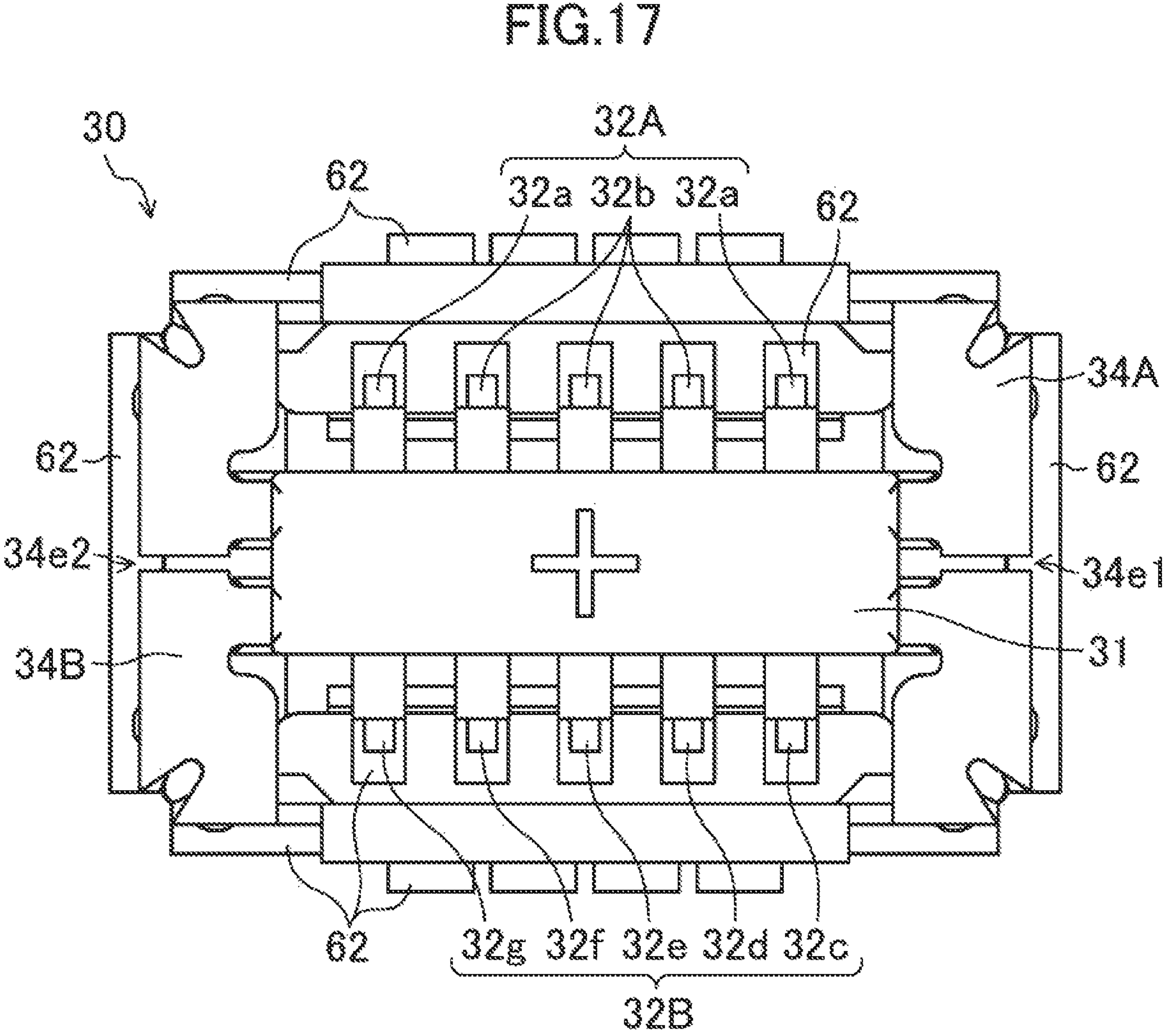
FIG. 17 is a top view showing the header on a pad according to the embodiment of the present disclosure.

As shown in FIG. 17, this configuration allows a visual check of the quality of soldering between the pad 62 and the posts 32*a* to 32*g* in the process of soldering therebetween. Accordingly, the yield improves in the soldering process.

As shown in FIGS. 2, 11, and 18, in this embodiment, each of the second portion 34A2 of the first header shield member 34A and the second portion 34B2 of the second header shield member 34B has partially a U-shaped cross section in the second direction. Specifically, as shown in FIGS. 13 to 16 and 18, the second portion 34A2 of the first header shield member 34A includes a shield body 34*a* and a shield bent portion 34*f*.

The shield bent portion 34*f* of the second portion 34A2 is connected to the shield body 34*a* of the second portion 34A2 and is bent to be farther from the terminal holding side wall 31*b* than the shield body 34*a* so as to have a curved portion 342 closer to the socket 20 to be inserted.

The curved portion 342 of the shield bent portion 34*f* of the second portion 34B2 has a ridge extending in the first direction. The radius center of the arc of the curved portion 342 is located farther from the socket 20 to be inserted (i.e., higher) than the apex (i.e., the ridge) of the curved portion 342. In addition, the curved portion 342 is located at the top of the second portion 34B2 closer to the socket 20 to be inserted. The shield bent portion 34*f* of the second portion 34A2 may be flexible.

The shield body 34*a* of the second portion 34A2 has side walls extending in the second and third directions. The shield bent portion 34*f* has side walls extending in the second and third directions.

The side walls of the shield body 34*a* and the shield bent portion 34*f* of the second portion 34A2 are connected together via the curved portion 342. The side walls of the shield body 34*a* are located outside (at both ends of) the side walls of the shield bent portion 34*f* in the first direction. The side walls of the shield body 34*a* include a fourth shield 34*f*4 which will be described later.

Each first portion 34A1 of the first header shield member 34A includes a shield body **34*a* and a shield bent portion 34*f***.

The shield bent portion **34*f* of each first portion 34A1 is connected to the shield body 34*a* and bent to be farther from the terminal holder 31*a* than the shield body 34*a* so as to have a curved portion 342 closer to the socket 20** to be inserted.

The shield bent portion **34*f* of each first portion 34A1 of the first header shield member 34A has a side wall (or a second shield 34*f*2) covering the outer wall surface 31*d*1 or 31*e*1 of the associated one of the header side wall connectors 31*d* or 31*e***.

In the second portion 34A2 of the first header shield member 34A, each shield bent portion **34*f* covering the outer wall surfaces 31*d*1 or 31*e*1 of the associated one of the header side wall connectors 31*d* or 31*e* in the first direction is referred to as the "fourth shield 34*f*4**".

Similarly, the header shield member 34B includes a shield body **34*a* and a shield bent portion 34*f* bent farther from the terminal holding side wall 31*c***.

As shown in FIG. 13, in this embodiment, in each shield connector **34*b* of the header shield member 34A connected to the header side wall connectors 31*d* and 31*e*, as viewed in the third direction (i.e., in a top view), at the edge 34*c*1 and opening of the associated cutout 34*c*, an outer edge 34*c*2 connected to the edge 34*c*1 forms an angle θ2 smaller than 90°. This also applies to the shield connectors 34*b* of the header shield member 34B connected to the header side wall connectors 31*d* and 31*e***.

This configuration reduces the gap of each cutout **34*c* as compared to the case in which the outer edge 34*c*2 connected to the edge 34*c*1 forms an angle θ2 greater than or equal to 90° at the edge 34*c*1 and opening of the cutout 34*c***. The employment of this configuration further reduces unnecessary radiation and noise caused by the RF signals.

Configurations of Socket and Header Terminal Sections

Figure 19:
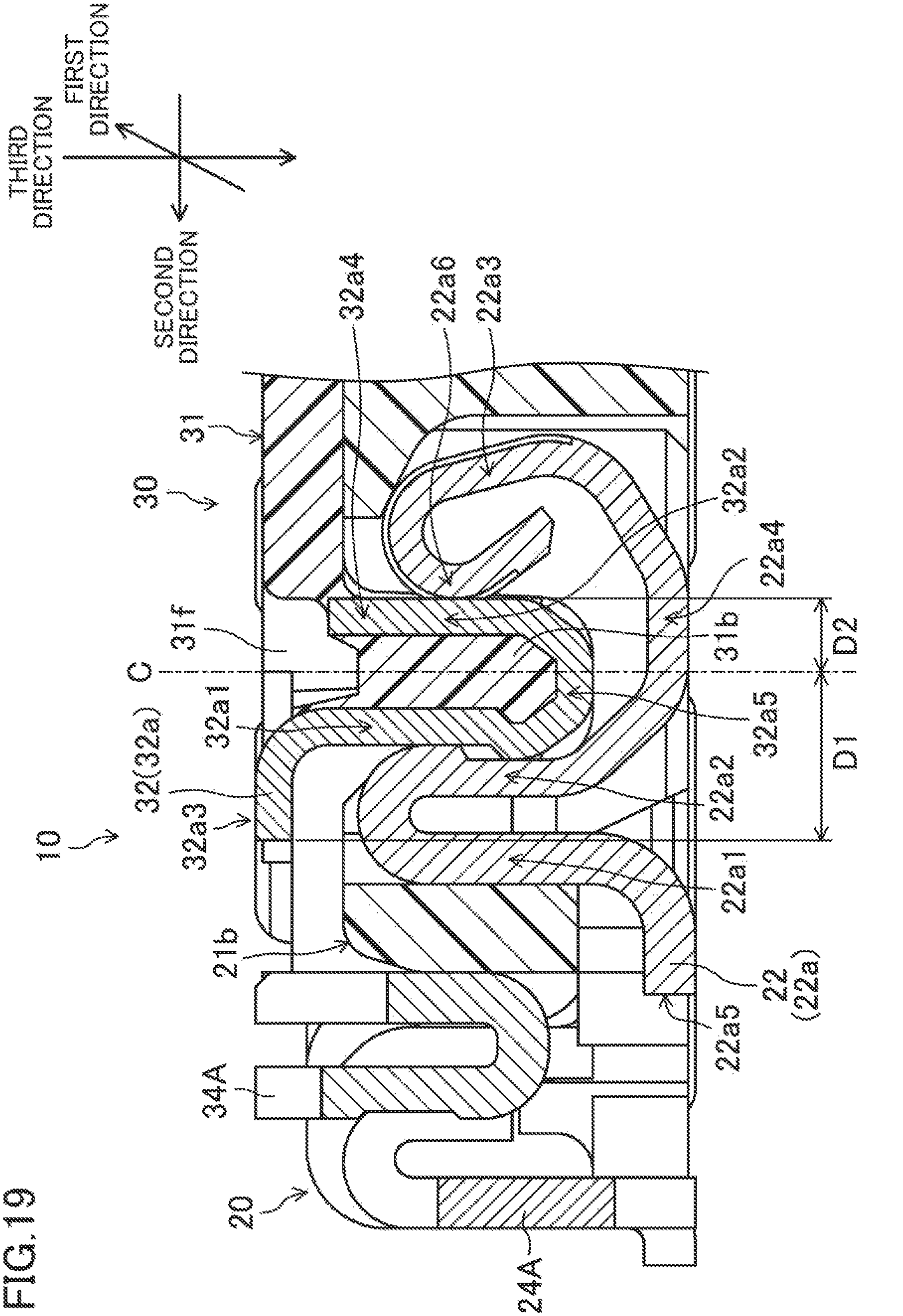
FIG. 19 is a partial enlarged cross-sectional view of a connection between terminals in a region including side walls of the header and the socket constituting the connector according to the embodiment of the present disclosure.

Now, a configuration of an electrical connection between the socket terminal section 22 of the socket 20 and the header terminal section 32 of the header 30 will be described with reference to FIG. 19. FIG. 19 shows an enlarged cross-sectional configuration of the region including the socket side wall **21*b* and the terminal holding side wall 31*b* in FIG. 2**.

First, a configuration of the header terminal section 32 will be described.

In FIG. 19, the terminal holding side wall **31*b* of the header housing 31 is assumed to extend from its base 31*f* in the third direction (e.g., downward). Also, the header terminal section 32 is assumed to extend in the first direction perpendicular to the third direction. In this embodiment, the posts 32*a* and 32*b*, for example, have the same cross-sectional shape. One of the posts 32*a*** is thus raised as an example here.

The post **32*a* includes a first post extension 32*a*1 and a second post extension 32*a*2. The first post extension 32*a*1 extends in the third direction. The second post extension 32*a*2 extends opposite to the third direction (i.e., upward) and faces the first post extension 32*a*1 with the terminal holding side wall 31*b*** interposed therebetween.

The post **32*a* has a first post end 32*a*3 in the second direction (i.e., outside the header 30). The first post end 32*a*3 leads to a second post end 32*a*4 via the first post extension 32*a*1. On the other hand, the post 32*a* has the second post end 32*a*4 opposite to the second direction (i.e., inside the header 30). The second post end 32*a*4 leads to the first post end 32*a*3 via the second post extension 32*a*2. Accordingly, the first post extension 32*a*1 and the first post end 32*a*3 are aligned in the second direction with respect to the second post extension 32*a*2. In addition, the first post end 32*a*3 is exposed from the base 31*f*** in the second direction.

As shown in FIG. 19, a distance D1 from a center line C to the first post end **32*a*3 is longer than a distance D2 from the center line C to the second post end 32*a*4. The center line C extends in the third direction and equally divides the distance between the first and second post extensions 32*a*1 and 32*a*2** into two. Note that the distance here refers to the distance (e.g., the minimum distance) in the second direction with respect to the center line C extending in the third direction.

At this time, the second post end **32*a*4 faces the first post extension 32*a*1 with respect to the center line C with the terminal holding side wall 31*b* interposed therebetween. In addition, the post 32*a* includes a post connector 32*a*5 that connects the first and second post extensions 32*a*1 and 32*a*2. On the other hand, the post 32*a* has no portion facing the post connector 32*a*5 with respect to the center line C with the terminal holding side wall 31*b*** interposed therebetween.

Next, a configuration of the socket terminal section 22 will be described.

In FIG. 19, in the socket side wall **21*b* of the socket housing 21, the socket terminal section 22 extends in the first direction in correspondence to the header terminal section 32. In this embodiment, the contacts 22*a* to 22*g* have the same cross-sectional shape. One of the contacts 22*a*** is raised as an example.

The contact **22*a* includes a first contact extension 22*a*1, a second contact extension 22*a*2, and a third contact extension 22*a*3. The first contact extension 22*a*1 extends opposite to the third direction (upward). The second contact extension 22*a*2 extends in the third direction and faces the first contact extension 22*a*1. The third contact extension 22*a*3** extends opposite to the third direction.

The contact **22*a* further includes a contact connector 22*a*4 that connects the second and third contact extensions 22*a*2 and 22*a*3. The contact connector 22*a*4 is aligned with (located below) the post 32*a* of the header 30** in the third direction.

The contact **22*a* also includes a first contact end 22*a*5 connected to the first post extension 32*a*1 via the first and second contact extension 22*a*1 and 22*a*2. That is, the first contact end 22*a*5 is exposed from the bottom of the socket housing 21** in the second direction.

The contact **22*a* also has a second contact end 22*a*6 of the third contact extension 22*a*3 opposite to the first contact end 22*a*5. The second contact end 22*a*6 curves in the third direction so as to face the second contact extension 22*a*2 and is in contact with the second post extension 32*a*2**.

With the configuration described above, the second contact extension **22*a*2 of the contact 22*a* is in contact with and electrically connected to the first post extension 32*a*1 of the post 32*a* of the header 30, for example. At the same time, the second contact end 22*a*6 of the contact 22*a* is in contact with and electrically connected to the second post extension 32*a*2**.

Accordingly, in this embodiment, the contact **22*a* of the socket terminal section 22 is connected to the first post extension 32*a*1 of the second post 32*a* of the header terminal section 32. Therefore, the RF signals input to and output from the first contact end 22*a*5 of the contact 22*a* are input to and output from the first post end 32*a*3 of the post 32*a* mainly through the first post extension 32*a*1 located outside (in the second direction). That is, the RF signals input from the first contact end 22a5 are output from the first post end 32a3** with a relatively short path.

In addition, in the post 32a of the header terminal section 32, the distance D2 from the center line C to the second post end 32a4 inside the header 30 (i.e., opposite to the second direction) is shorter than the distance D1 from the center line C to the first post end 32a3 outside the header 30. The center line C extends between the first and second post extensions 32a1 and 32a2. Thus, even when the first contact 22a that is a terminal of the socket terminal section 22 and the second post extension 32a2 of the post 32a are connected at the same time, the signals pass through the second post extension 32a2 with a relatively short path. Accordingly, the signals when the first post extension 32a1 is electrically connected to the first contact 22a are less affected by the phase difference, for example. As a result, isolation (dielectric isolation) of the RF signals improves and deterioration in the radio frequency characteristics decrease.

In this embodiment, as shown in FIG. 14, a wiring pitch A among the posts 32a to 32g of the header 30 is smaller than a width B of each of the posts 32a to 32g. This allows the connector 10 to have a suitable impedance. For example, the ratio ((B/A)×100) of the width B of each post to the pitch A is set to 60% or less. Then, the impedance of the connector 10 can be matched to 50Ω(i.e., a nominal value). The width of each of the posts 32a to 32g is obtained not at the outer end to be connected to the wiring board, for example, but at the portion extending to the terminal holding side walls 31b and 31c.

Soldering Portion of Each Shield Member

Now, example mounting parts of the socket shield members 24A and 24B of the socket 20 according to this embodiment will be described. As shown in FIGS. 3 and 9, the lower ends of the socket shield members 24A and 24B are soldered. Here, all mountable lower end surfaces, that is, the surfaces that can be in contact with the pad 61 being a mount board, of the socket shield members 24A and 24B may be soldered.

Similarly, as shown in FIGS. 11 and 17, as the mounting parts of the header shield members 34A and 34B of the header 30 according to this embodiment, the lower ends of the header shield members 34A and 34B are soldered. Here, all mountable lower end surfaces, that is, the surfaces that can be in contact with the pad 62 being a mount board, of the header shield members 34A and 34B may be soldered.

In this manner, the socket 20 according to this embodiment includes, as the mounting parts, the lower ends of the socket shield members 24A and 24B that substantially cover the periphery of the socket housing 21 including the shield terminals 24d. Thus, even when external stress is applied to the socket 20 or the connector 10 after the soldering, the socket 20 or the connector 10 is hardly peeled off.

The header 30 according to this embodiment also includes, as the mounting parts, the lower ends of the header shield members 34A and 34B that substantially cover the periphery of the header housing 31 including the shield terminals 34d. Thus, even when external stress is applied to the header 30 after the soldering, the header 30 is hardly peeled off.

Connection Between Socket and Header Shield Members of Connector

Now, mechanical and electrical connection between the socket shield members 24A and 24B and the header shield members 34A and 34B as the connector 10 will be described with reference to the drawings.

In the connector 10 according to this embodiment, when the header 30 is fitted into the socket 20, the second portions 34A2 and 34B2 of the header shield members 34A and 34B overlap the second portions 24A2 and 24B2 of the socket shield members 24A and 24B in the second direction.

At this time, the second portions 24A2 and 24B2 of the socket shield members 24A and 24B come into contact with the second portions 34A2 and 34B2 of the header shield members 34A and 34B, respectively, in one preferred embodiment.

Specifically, as shown in FIGS. 2, 5, and 13, each of the second portions 34A2 and 34B2 of the header shield members 34A and 34B is inserted into the gap 51 between the second portion 24A2 or 24B2 of the associated one of the socket shield members 24A or 24B of the socket 20 and the terminal holder 21a of the socket 20.

At this time, each of the shield bent portions 24f of the second portions 24A2 and 24B2 of the socket shield members 24A and 24B is in contact with the associated one of the shield bent portions 34f of the second portions 34A2 and 34B2 of the header shield members 34A and 34B.

When the header 30 is fitted into the socket 20, the outer part of each of the shield bent portions 34f of the header shield members 34A and 34B is in contact with the outer part of the associated one of the shield bent portions 24f of the socket shield members 24A and 24B, which facilitates the fitting. In one preferred embodiment, at least the header shield members 34A and 34B or the socket shield members 24A and 24B are elastic, bendable in the second direction. This reduces deformations of the header shield members 34A and 34B and the socket shield members 24A and 24B at the time of fitting. In addition, the rigidity of the connector 10 itself improves after the fitting of the header 30 into the socket 20.

Each of the terminal holding side walls 21b0 and 21c0 of the socket 20 is inserted between the associated one of the second portions 34A2 or 34B2 of the header shield member 34A or 34B and the associated one of the terminal holding side walls 31b or 31c of the header 30.

When the header 30 is fitted into the socket 20, the first portions 34A1 and 34B1 of the header shield members 34A and 34B overlap the first portions 24A1 and 24B1 of the socket shield members 24A and 24B in the first direction.

Specifically, the first portions 34A1 and 34B1 of the header shield members 34A and 34B are inserted between the first portions 24A1 and 24B1 of the socket shield members 24A and 24B and the holding wall 21f and between the first portions 24A1 and 24B1 and the terminal holding side walls 21b0 and 21c0 of the socket 20, respectively.

In the connector 10 according to this embodiment, for example, the portions of the first socket and header shield members 24A and 34A facing the first socket and header terminal section 22A and 32A, respectively, have, at the maximum, the four-layer structure of the first socket and header shield members 24A and 34A. This configuration further reduces unnecessary radiation and a mixture of noise caused by the RF signals.

The first header shield member 34A may have at least one projection 34g projecting outside the header housing 31. The projection 34g is in contact with the first socket shield member 24A of the socket 20.

Specifically, in each of the first portions 34A1 and 34B1 of the header shield members 34A and 34B, the second shield 34f2 has the projection 34g projecting outward in the first direction. The projection 34g comes into contact with the first shield 24*f*1 of each first portion 24A1 or 24B1 of the associated one of the socket shield members 24A or 24B.

Similarly, in each of the second portions 34A2 and 34B2 of the header shield members 34A and 34B, the fourth shield 34*f*4 has the projection 34*g* projecting outward in the second direction. This projection 34*g* comes into contact with the third shield 24*f*3 of the second portion 24A2 or 24B2 of the associated one of the socket shield members 24A or 24B.

This configuration further reduces unnecessary radiation and a mixture of noise caused by the RF signals.

In the socket 20 described above, each of the socket shield members 24A and 24B includes no projection projecting outside the socket housing 21 but may also include at least one projection.

In the connector 10 according to one embodiment, the header shield members 34A and 34B are fitted into the respective gaps between the socket shield members 24A and 24B of the socket 20 and the socket side walls 21*b* and 21*c*.

However, the configuration is not limited thereto. The socket shield members 24A and 24B may be fitted in the respective gaps between the header shield members 34A and 34B and the terminal holding side walls 31*b* and 31*c*. However, in this case, the surfaces of the header terminal sections 32A and 32B facing the header shield members 34A and 34B need to be insulated by an insulating member.

Figure 16:
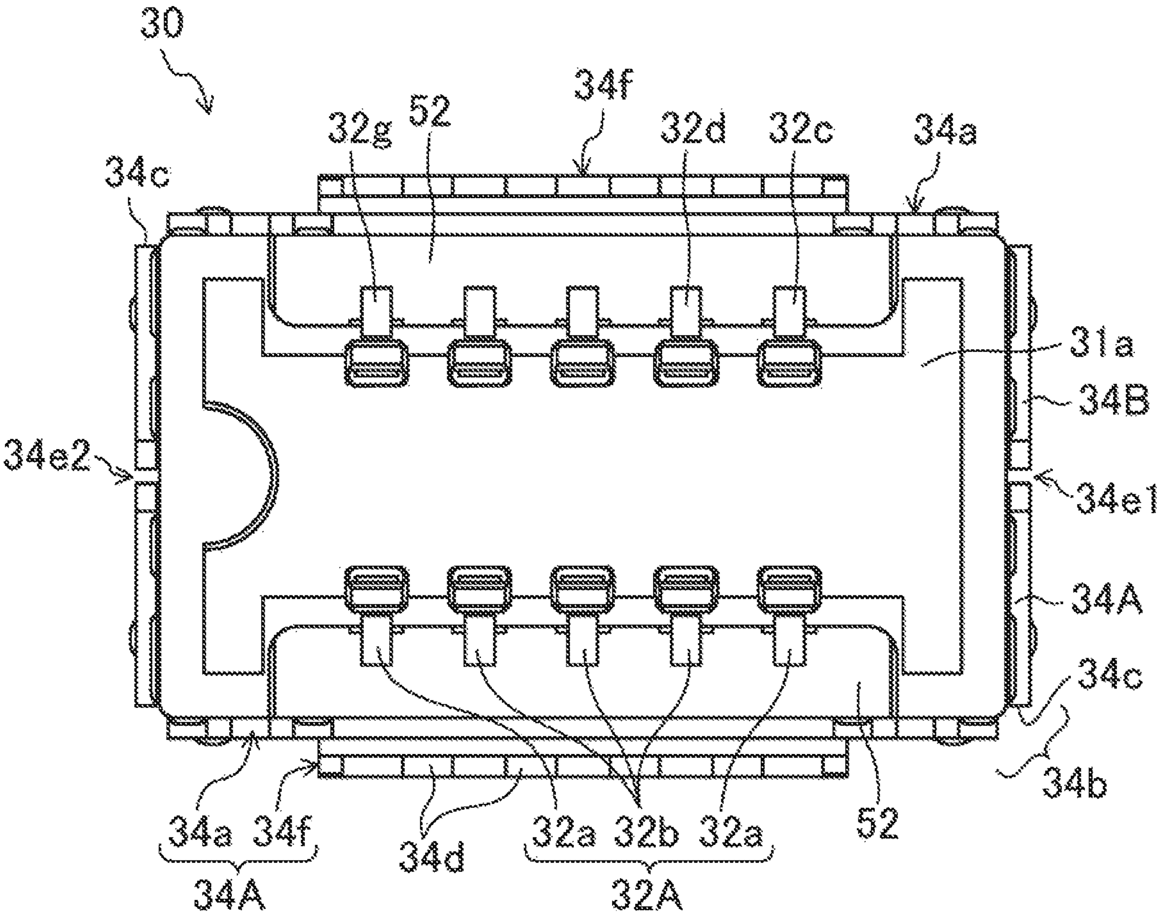
FIG. 16 is a bottom view of the header according to the embodiment of the present disclosure.

As clear from the top view of the socket 20 in FIG. 5 and the bottom view of the header 30 in FIG. 16, when the header 30 is fitted into the socket 20, the socket side wall connectors 21*d* and 21*e* are adjacent and opposed to the header side wall connectors 31*d* and 31*e* in the first direction. The slits 24*e*1 and 24*e*2 of the shield members 24A and 24B of the socket side wall connectors 21*d* and 21*e* do not overlap the slits 34*e*1 and 34*e*2 of the shield members 34A and 34B of the adjacent and opposed header side wall connectors 31*d* and 31*e* in the first direction in one preferred embodiment.

With this configuration, when the socket 20 and the header 30 are fitted, the positions of the slits 24*e*1 and 24*e*2 and the socket and the slits 34*e*1 and 34*e*2 of the header 30 are not aligned but shifted. For this reason, in each of the slits 24*e*1, 24*e*2, 34*e*1, and 34*e*2, unnecessary radiation along the long sides of the connector 10 (in the direction in which the socket side wall connectors 21*d* and 21*e* face each other) is shielded by the other shield members 24A and 34A, for example. This configuration reduces unnecessary radiation and a mixture of noise.

Connector Constituting Module

Figure 20:
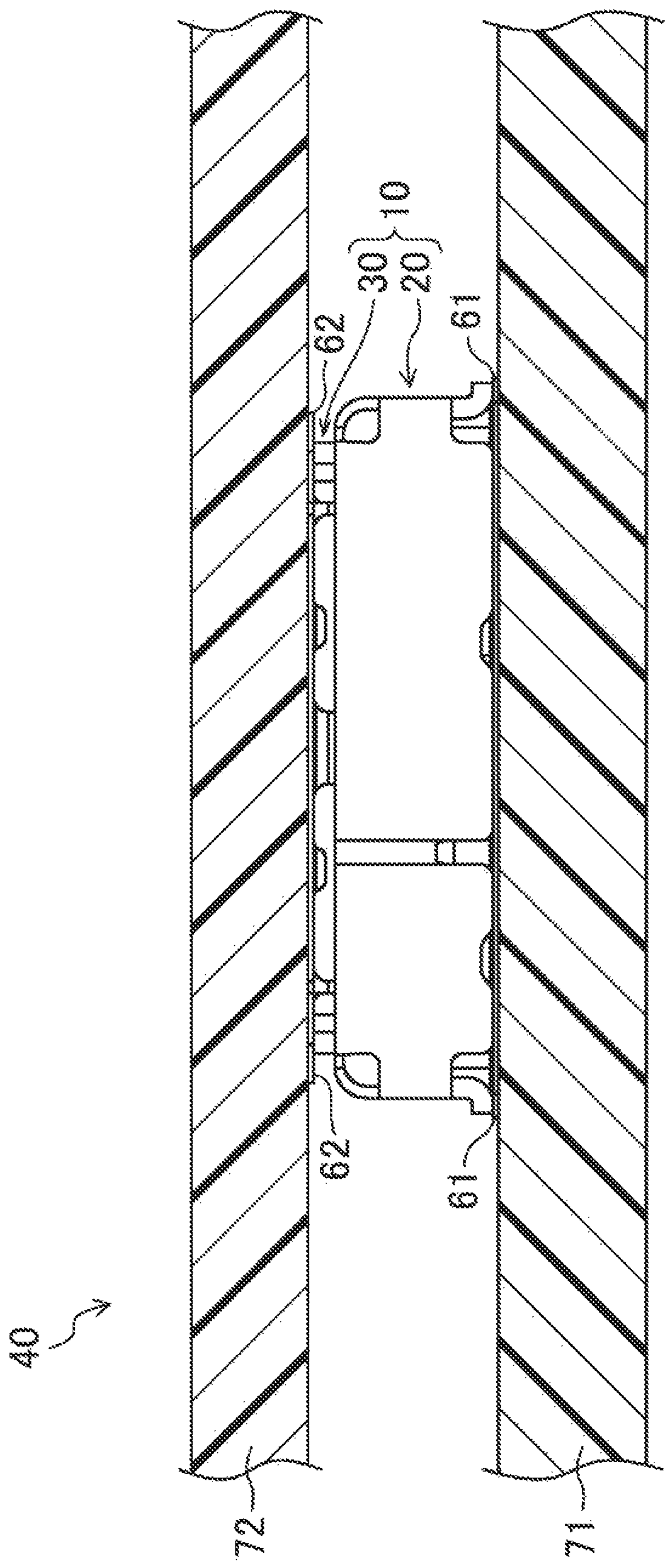
FIG. 20 is a partial cross-sectional view including the connector constituting a module according to the embodiment of the present disclosure.

FIG. 20 shows a partial cross-sectional configuration of a module (electronic module) 40 including the connector 10 according to this embodiment.

Specifically, the connector 10 according to this embodiment is configured by fitting the socket 20 and the header 30. The socket 20 is, for example, mounted on a plurality of pads 61 on the mounting surface of a circuit board 71 made of a resin. The header 30 is, for example, mounted on a plurality of pads 62 on the mounting surface of a wiring board 72 made of resin.

Here, the module 40 may be a well-known electronic device, for example, a mobile device for mobile communication.

The connector constituting the module 40 includes the socket 20 and the header 30 with at least the features shown in FIGS. 5 and 13.

Specifically, in the socket 20, the socket terminal sections 22A and 22B face the socket shield members 24A and 24B located outside with the respective gaps 51 interposed therebetween. Then, as shown in FIG. 9, at least some of the mounting terminals of the contacts 22*a* to 22*g* of the socket 20 become visible.

Specifically, the distal ends of the socket terminal sections 22A and 22B are located in the gaps 51 between the second portions 24A2 and 24B2 of the shield members 24A and 24B of the socket 20 and the terminal holder 21*a* as viewed in the third direction.

Specifically, in the header 30, the header terminal sections 32A and 32B face the header shield members 34A and 34B located outside with the respective gaps 52 interposed therebetween. Then, as shown in FIG. 17, some of the mounting terminals of the posts 32*a* to 32*g* of the header 30 become visible.

Specifically, the distal ends of the header terminal sections 32A and 32B are located in the gaps 52 between the second portions 34A2 and 34B2 of the shield members 34A and 34B of the header 30 and the terminal holder 31*a* as viewed in the third direction.

As shown in FIGS. 9 and 17, this configuration allows a visual check of the quality of soldering the contacts 22*a* to 22*g* and the posts 32*a* to 32*g* to the pads 61 and 62, respectively, in the process of soldering. Accordingly, the yield improves in the soldering process of the contacts and posts.

In addition, the peripheries of the contacts 22*a* to 22*g* and the posts 32*a* to 32*g* including the respective pads 61 and 62 are covered by the shield members 24A, 24B, 34A, and 34B, which further reduces unnecessary radiation and noise caused by the RF signals.

Note that at least the RF signals may be applied to the contacts inside the socket shield members 24A and 24B. Similarly, at least the RF signals may be applied to the posts inside the header shield members 34A and 34B. Alternatively, the connector 10 herein may handle signals except the RF signals.

What is claimed is:

1. A header to be fitted to a socket, comprising:

a housing;

a header terminal section held by the housing and electrically connected to a socket terminal section serving as a terminal section of the socket; and a first shield member that includes a first shield portion extending in a first direction and is held by the housing, wherein:

the header terminal section includes a first header terminal section that includes a plurality of contacts arranged in the first direction and serves as at least one header terminal section, the first header terminal section is aligned with the first shield portion in a second direction intersecting the first direction, the header and the socket are inserted into each other in a third direction, the first direction and the second direction intersect with each other in the third direction, the first shield portion includes a shield body and a plurality of shield terminals projecting downward from a lower end of the shield body in the third direction, the plurality of contacts of the first header terminal section include a first contact and a second contact aligned with the first contact in the first direction, the plurality of shield terminals include a first shield terminal and a second shield terminal aligned with the first shield terminal in the first direction, an end for mounting of the first contact and an end for mounting of the second contact are located inside the header separately from the first shield terminal and the second shield terminal, and as viewed in the second direction, only the first contact among the plurality of contacts of the first header terminal section is disposed between the first shield terminal and the second shield terminal.

2. The header of claim 1, wherein the plurality of shield terminals include a third shield terminal aligned with the second shield terminal in the first direction, on an opposite side of the first shield terminal in the first direction, and as viewed in the second direction, only the second contact among the contacts of the first header terminal section is disposed between the second shield terminal and the third shield terminal.

3. The header of claim 1, wherein the housing includes a terminal holder holding the first contact and the second contact, and the end for mounting of the first contact and the end for mounting of the second contact are exposed between the first shield member and the terminal holder as viewed from an upward side of the third direction.

4. The header of claim 1, wherein the end for mounting of the first contact and the end for mounting of the second contact are visible between the first shield terminal and the second shield terminal as viewed from one side in the second direction.

5. The header of claim 1, wherein the first shield portion further includes a curved portion curving from an upper end of the shield body toward an inside of the header.

6. The header of claim 1, wherein the first shield portion further includes a second shield located in the second direction with respect to the first shield body, and a curved portion connecting the upper end of the first shield body with the second shield.

7. The header of claim 1, wherein the housing includes a side wall provided with the first shield portion and extending in the first direction.

8. The header of claim 1, wherein the first shield member includes a second shield portion extending in the second direction and connecting with the first shield portion.

9. The header of claim 8, wherein the housing includes a side wall connector provided with the second shield portion and extending in the second direction.

10. The header of claim 1, wherein the first shield terminal and the second shield terminal are connectable to a mount body external to the header provided with the header.

11. A connector, comprising:

the header of claim 1; and the socket, wherein the socket includes a second shield member serving as a shield member, and the first shield member is in contact with the second shield member when the header is fitted to the socket.

12. A connector, comprising:

the header of claim 1; and the socket, wherein:

each of the first contact and the second contact includes a first extension extending along the third direction, a second extension extending along the third direction and facing the first extension and the second direction, a header connecting portion connecting the first extension with the second extension, a first contact portion formed in the first extension and being contact with the contact of the socket terminal section, and a second contact portion formed in the second extension and being in contact with the contact of the socket terminal section, and the contact of the socket terminal section includes:

a third extension that can be in contact with the first contact portion and extends along the third direction, a fourth extension that can be in contact with the second contact portion and extends along the third direction, and a socket connecting portion connecting the third extension with the fourth extension, and the first contact portion and the second contact portion are disposed between the third extension and the fourth extension with the socket and the header being fitted into each other.

13. A header to be fitted to a socket, comprising:

a housing;

a header terminal section held by the housing and electrically connected with a socket terminal section serving as a terminal section of the socket; and a first shield member that includes a first shield portion extending in a first direction and is held by the housing, wherein:

the header terminal section includes a first contact which is at least one contact adjacent to the first shield portion in a second direction intersecting the first direction, the header and the socket are inserted into each other in a third direction, the first direction and the second direction intersect in the third direction, the first shield portion includes a shield body and a plurality of shield terminals projecting downward from a lower end of the shield body in the third direction, the plurality of shield terminals includes a first shield terminal and a second shield terminal adjacent to the first shield terminal in the first direction, the first contact includes a contact portion that can be in contact with a third contact serving as a contact of the socket terminal section, and an end for mounting located closer to the first shield terminal than the contact portion, the end for mounting of the first contact is located inside the header separately from the first shield terminal and the second shield terminal, as viewed in the second direction, only the first contact is disposed between the first shield terminal and the second shield terminal.

14. A connector, comprising:

the header of claim 13; and the socket, wherein:

a contact of the terminal section of the socket includes a first extension that can be in contact with the first contact portion and extends along the third direction, a second extension that can be in contact with the second contact portion and extends along the third direction, and a connecting portion connecting the first extension with the second extension, and the contact of the terminal section of the socket includes an end for mounting connected with the first extension.

15. The header of claim 13, wherein the first shield member includes the first shield portion includes a pair of first shield portions extending in the first direction and aligned in the second direction, the header terminal section includes a first header terminal section including the first contact adjacent to one of the pair of first shield portions, and a second header terminal section disposed in the second direction with respect to the first header terminal section and including at least one contact adjacent to the other one of the pair of first shield portions.

16. The header of claim 13, wherein the at least one contact includes an extension extending along the third direction including the contact portion.

17. The header of claim 13, wherein the at least one contact includes a first extension extending along the third direction, a second extension extending along the third direction and facing the first extension and the second direction, and a connecting portion connecting the first extension with the second extension, the contact portion includes a first contact portion formed in the first extension, and a second contact portion formed in the second extension, and the end for mounting is connected with the first extension.

18. A connector, comprising:

the header of claim 13;

the socket; and a mount body connected with the header terminal section and the first shield member.

19. The connector of claim 18, wherein a contact of the terminal section of the socket includes a first extension that can be in contact with the first contact portion and extends along the third direction, a second extension that can be in contact with the second contact portion and extends along the third direction and a connecting portion connecting the first extension with the second extension, and the contact of the terminal section of the socket includes an end for mounting connected with the first extension.

20. A connector, comprising:

the header of claim 13; and the socket, wherein:

the contact of the socket terminal section includes a first extension that can be in contact with the first contact portion and extends along the third direction, a second extension that can be in contact with the second contact portion and extends along the third direction, a connecting portion connecting the first extension with the second extension, and the first contact portion and the second contact portion are disposed between the first extension and the second extension with the socket and the header being fitted into each other.

21. The connector of claim 20, wherein an end for mounting of the contact of the socket terminal section is connected with the third extension.

* * * * *